US010827693B2

(12) United States Patent
Anderson et al.

(10) Patent No.: US 10,827,693 B2
(45) Date of Patent: Nov. 10, 2020

(54) SPRAYERS IN A TEMPERATURE INVERSION

(71) Applicant: Deere & Company, Moline, IL (US)

(72) Inventors: Noel W. Anderson, Fargo, ND (US); Richard A. Humpal, Ankeny, IA (US); Terence D. Pickett, Waukee, IA (US); Travis G. Funseth, Ankeny, IA (US)

(73) Assignee: Deere & Company, Moline, IL (US)

( * ) Notice: Subject to any disclaimer, the term of this patent is extended or adjusted under 35 U.S.C. 154(b) by 166 days.

(21) Appl. No.: 15/896,776

(22) Filed: Feb. 14, 2018

(65) Prior Publication Data

US 2019/0246579 A1 Aug. 15, 2019

(51) Int. Cl.

| | |
|---|---|
| ***A01G 25/02*** | (2006.01) |
| ***A01G 25/16*** | (2006.01) |
| ***A01G 27/00*** | (2006.01) |
| ***A01M 7/00*** | (2006.01) |

(52) U.S. Cl.

CPC ............. *A01G 25/16* (2013.01); *A01G 25/02* (2013.01); *A01G 27/003* (2013.01); *A01M 7/0089* (2013.01); *G05B 2219/2625* (2013.01)

(58) Field of Classification Search

CPC ...... A01G 25/02; A01G 25/16; A01G 27/003; A01M 7/0089; G05B 2219/2625

See application file for complete search history.

(56) References Cited

U.S. PATENT DOCUMENTS

| | | | | |
|---|---|---|---|---|
| 3,825,072 A | | 7/1974 | Collins | |
| 5,755,382 A | * | 5/1998 | Skotinkov ............ | A01B 51/026 180/411 |
| 7,143,980 B2 | | 12/2006 | Heller et al. | |
| 8,571,764 B2 | | 10/2013 | Peterson et al. | |
| 2003/0225488 A1 | | 12/2003 | Heller | |
| 2009/0099737 A1 | | 4/2009 | Wendte et al. | |

(Continued)

FOREIGN PATENT DOCUMENTS

| | | | | |
|---|---|---|---|---|
| CA | 2525878 C | * | 2/2014 ............. | A01B 63/32 |
| JP | 10080655 A | * | 3/1998 | |

(Continued)

OTHER PUBLICATIONS

Extended EP Search Report EP Application No. 1915661.6 dated Jul. 16, 2019, 7 pages.

(Continued)

*Primary Examiner* — Jennifer L Norton

(74) *Attorney, Agent, or Firm* — Joseph R. Kelly; Kelly, Holt & Christenson, PLLC

(57) ABSTRACT

A mobile agricultural sprayer includes at least one sensor configured to generate a signal indicative of a temperature inversion at a worksite. The mobile agricultural sprayer also includes an inversion detection system configured to detect a presence of the temperature inversion at the worksite based on the sensor signal, and, based on the detected presence, generate a temperature inversion output indicative of the presence of the temperature inversion. The mobile agricultural sprayer also includes an action signal generator configured to receive the temperature inversion output from the inversion detection system, and, based on the received temperature inversion output, generate an action signal.

20 Claims, 13 Drawing Sheets

(56) References Cited

U.S. PATENT DOCUMENTS

| | | | | |
|---|---|---|---|---|
| 2011/0247263 | A1* | 10/2011 | Hu | A01G 13/08 47/2 |
| 2013/0103211 | A1* | 4/2013 | Peterson | A01B 79/005 700/284 |
| 2013/0105591 | A1 | 5/2013 | Peterson | |
| 2013/0292487 | A1* | 11/2013 | Ballu | A01M 7/0089 239/71 |
| 2013/0345937 | A1* | 12/2013 | Strelioff | A01D 41/145 701/50 |
| 2015/0024674 | A1* | 1/2015 | McGregor | A01G 13/08 454/258 |
| 2017/0006852 | A1* | 1/2017 | Engelbrecht | A01M 7/0042 |
| 2017/0334560 | A1 | 11/2017 | O'Connor et al. | |
| 2018/0111148 | A1* | 4/2018 | Batcheller | A01M 7/0042 |
| 2018/0348714 | A1* | 12/2018 | Larue | A01G 25/16 |
| 2019/0357520 | A1* | 11/2019 | Redden | A01M 7/0042 |
| 2020/0221682 | A1* | 7/2020 | Grimm | A01M 7/006 |

FOREIGN PATENT DOCUMENTS

| | | | | |
|---|---|---|---|---|
| WO | WO-2012091988 | A1 * | 7/2012 | A01M 7/0089 |
| WO | 2016145081 | A2 | 9/2016 | |

OTHER PUBLICATIONS

EP Application No. 19156611.6 European Extended Search Report dated Jul. 16, 2019, 7 pages.

Kansas State drift risk model https://www.agdaily.com/news/temperature-inversion-dicamba-drift-risk. Nov. 21, 2017, 4 pages.

http://news.utcrops.com/2017/06/best-management-practices-mitigate-dicamba-drift, Jun. 26, 2017. 2 pages.

http://www.sciencedrect.com/science/article/pii/S0003682X0200104. vol. 64, Issue 4, Apr. 2003, 3 pages.

* cited by examiner

SPRAYERS IN A TEMPERATURE INVERSION

FIELD OF THE DESCRIPTION

The present description relates to detecting a temperature inversion. More specifically, the present description relates to detecting a temperature inversion at an agricultural worksite.

BACKGROUND

There are many different types of agricultural machines. One such machine is a sprayer. An agricultural sprayer often includes a tank or reservoir that holds a substance to be sprayed on an agricultural field. The sprayer also includes a boom that is fitted with one or more nozzles that are used to spray the substance on the field. As the sprayer travels through the field, the boom is moved to a deployed position and the substance is pumped from the tank or reservoir, through the nozzles, so that it is sprayed or applied to the field over which the sprayer is traveling.

While the sprayer traverses the field spraying the substance, an operator must be careful of substance drift that may occur as the substance is sprayed over a target area. In some circumstances, tiny, aerosol-size droplets, larger droplets, or even particulates of the substance can drift away from their target and destroy or negatively impact non-targeted crops and areas. Furthermore, certain environmental conditions can contribute to the drift of the substance over increasingly large areas. For example, under the environmental conditions in which a temperature inversion is present, the droplets may travel across undesired adjacent pieces of land.

The discussion above is merely provided for general background information and is not intended to be used as an aid in determining the scope of the claimed subject matter.

SUMMARY

A mobile agricultural sprayer includes at least one sensor configured to generate a signal indicative of a temperature inversion at a worksite. The mobile agricultural sprayer also includes an inversion detection system configured to detect a presence of the temperature inversion at the worksite based on the sensor signal, and, based on the detected presence, generate a temperature inversion output indicative of the presence of the temperature inversion. The mobile agricultural sprayer also includes an action signal generator configured to receive the temperature inversion output from the inversion detection system, and, based on the received temperature inversion output, generate an action signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

During a spraying operation, it may be desirable to monitor certain environmental conditions that can contribute to a drift of a substance across various worksite areas. For example, during a spraying operation, a pesticide may be applied to a specific target area. However, under certain environmental conditions, tiny, aerosol-size droplets, larger droplets, or even particulates of the pesticide may drift away from the specific target area and negatively impact crops and other non-designated areas.

One environmental condition that contributes to unwanted drift of a substance is known as a temperature inversion. This will be discussed in more detail later. However, in one example, a temperature inversion may result from a greater emission of terrestrial radiation energy from the Earth's surface compared to received atmospheric radiation and conducted radiation from deeper soil. When a temperature inversion is present, the lower atmosphere is classified as "very stable" as very little vertical air mixing occurs. As such, air flow throughout the inversion is primarily only horizontal (laminar flow) leading to favorable conditions for the drift of a substance into undesired areas. It can therefore be desirable that certain environmental conditions are monitored. Additionally, some governmental regulations may even prohibit the spraying of certain substances during temperature inversions.

In order to accurately monitor for, and detect, temperature inversions throughout a worksite, a temperature inversion system accurately detects and predicts a presence of a temperature inversion. In one example, an action signal generator can receive a generated temperature inversion output from the temperature inversion system and can generate action signals to notify an operator of the temperature inversion or modify operating characteristics of the sprayer either manually or automatically.

Figure 1:
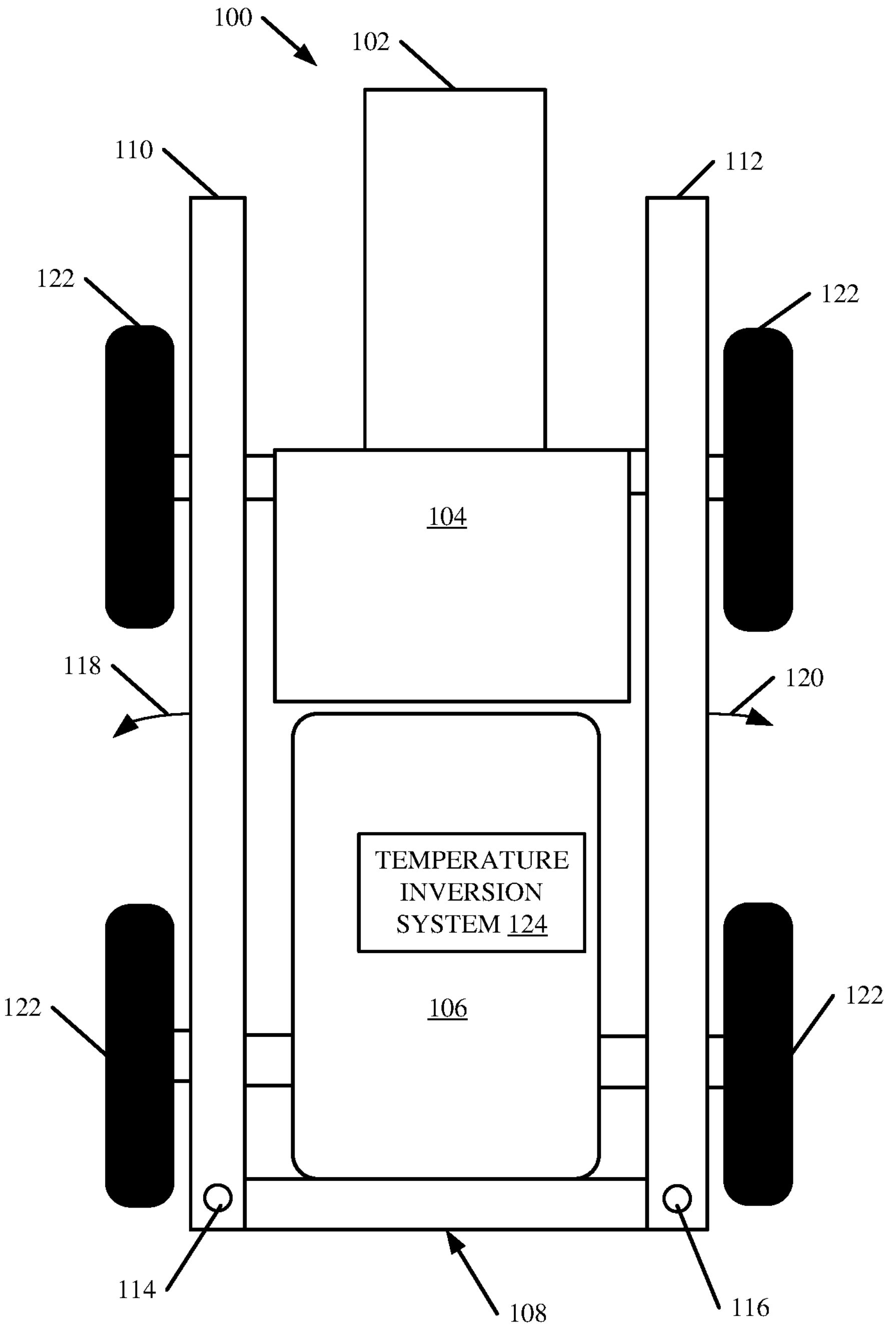
FIG. 1 is a pictorial illustration showing one example of an agricultural spraying machine.

FIG. 1 is a pictorial illustration showing one example of an agricultural spraying machine (or sprayer) 100. Sprayer 100 illustratively includes an engine in engine compartment 102, an operator's compartment 104, a tank 106, that stores material to be sprayed, and an articulated boom 108. Boom 108 includes arms 110 and 112 which can articulate or pivot about points 114 and 116 to a travel position illustrated in FIG. 1. Agricultural sprayer 100 is supported for movement by a set of traction elements, such as wheels 122. The traction elements can also be tracks, or other traction elements as well. When a spraying operation is to take place, boom arms 110-112 articulate outward in the directions indicated by arrows 118 and 120, to a spraying position respectively. Boom 108 carries nozzles that spray material that is pumped from tank 106 onto a field over which sprayer 100 is traveling. This is described in greater detail below with respect to FIGS. 2-5.

FIG. 1 also shows that sprayer 100 includes a temperature inversion system 124 configured to detect or predict a presence of a temperature inversion at a worksite. This will be discussed further in FIGS. 2-3. Briefly, however, as sprayer 100 travels across a worksite area, an indication of a temperature inversion is provided to temperature inversion system 124. In one example, this can include sensor signals, or an indication provided from an unmanned aerial vehicle or ground-based asset. Upon receiving the indication of a temperature inversion, temperature inversion system 124 can detect a presence of a temperature inversion and generate a temperature inversion output. In one example, the temperature inversion output can be provided to an action signal generator which can generate action signals to generate a user interface display or control signals to modify a controllable subsystem of sprayer 100. Additionally, temperature inversion system 124 can utilize a wide array of temperature inversion data to predict a future presence of a temperature inversion. This can include obtaining weather data, field data pertaining to a worksite to be sprayed, and/or substance data relating to properties of the substance to be sprayed. While sprayer 100 is illustratively a terrestrial sprayer, it is also contemplated that sprayer 100 may be an aerial and/or an aquatic sprayer as well.

Figure 2A:
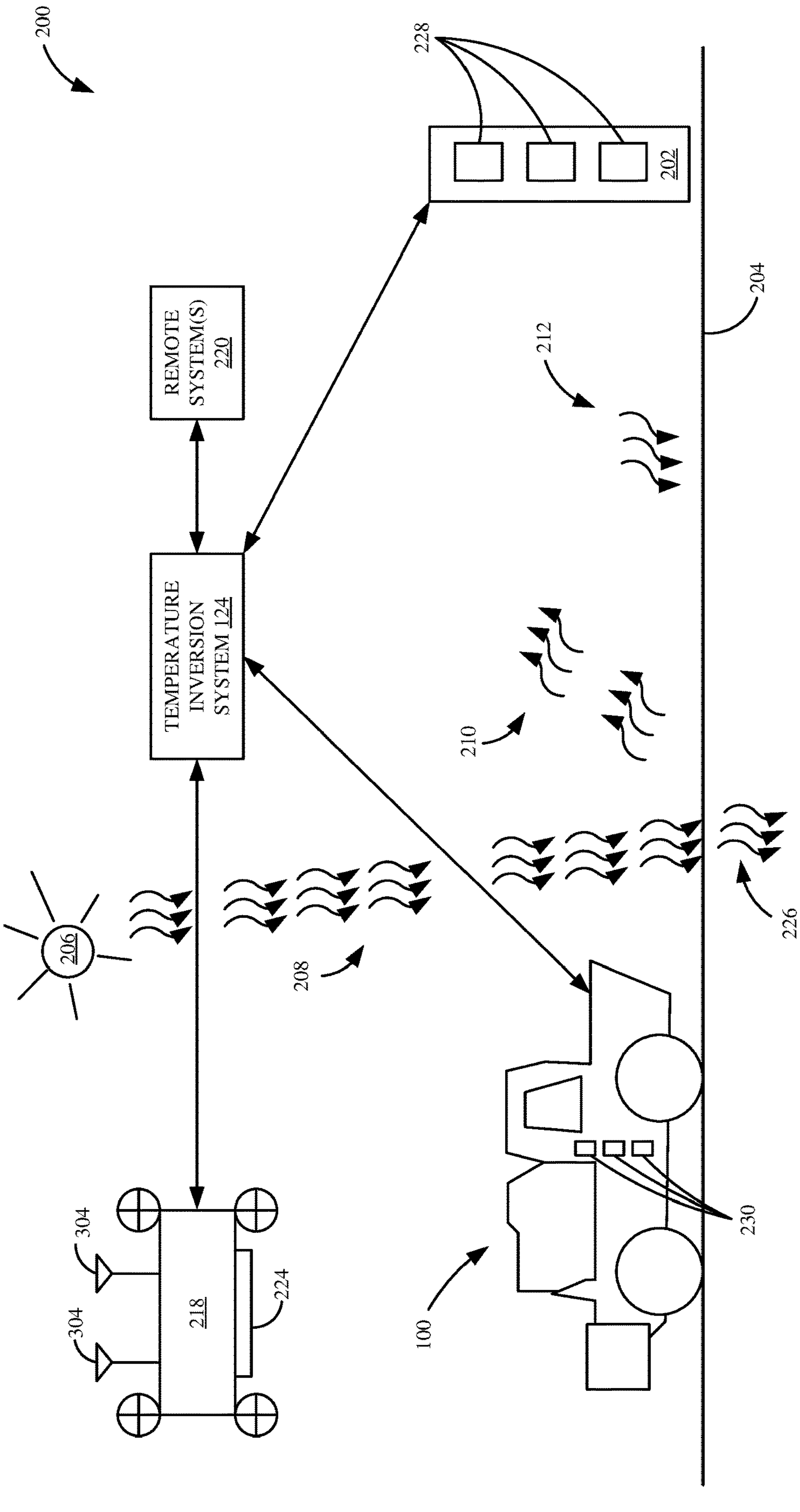
FIGS. 2A-2B are pictorial illustrations showing the sprayer, illustrated in FIG. 1, an unmanned aerial vehicle (UAV) and a ground-based asset deployed at a worksite.
Figure 2B:
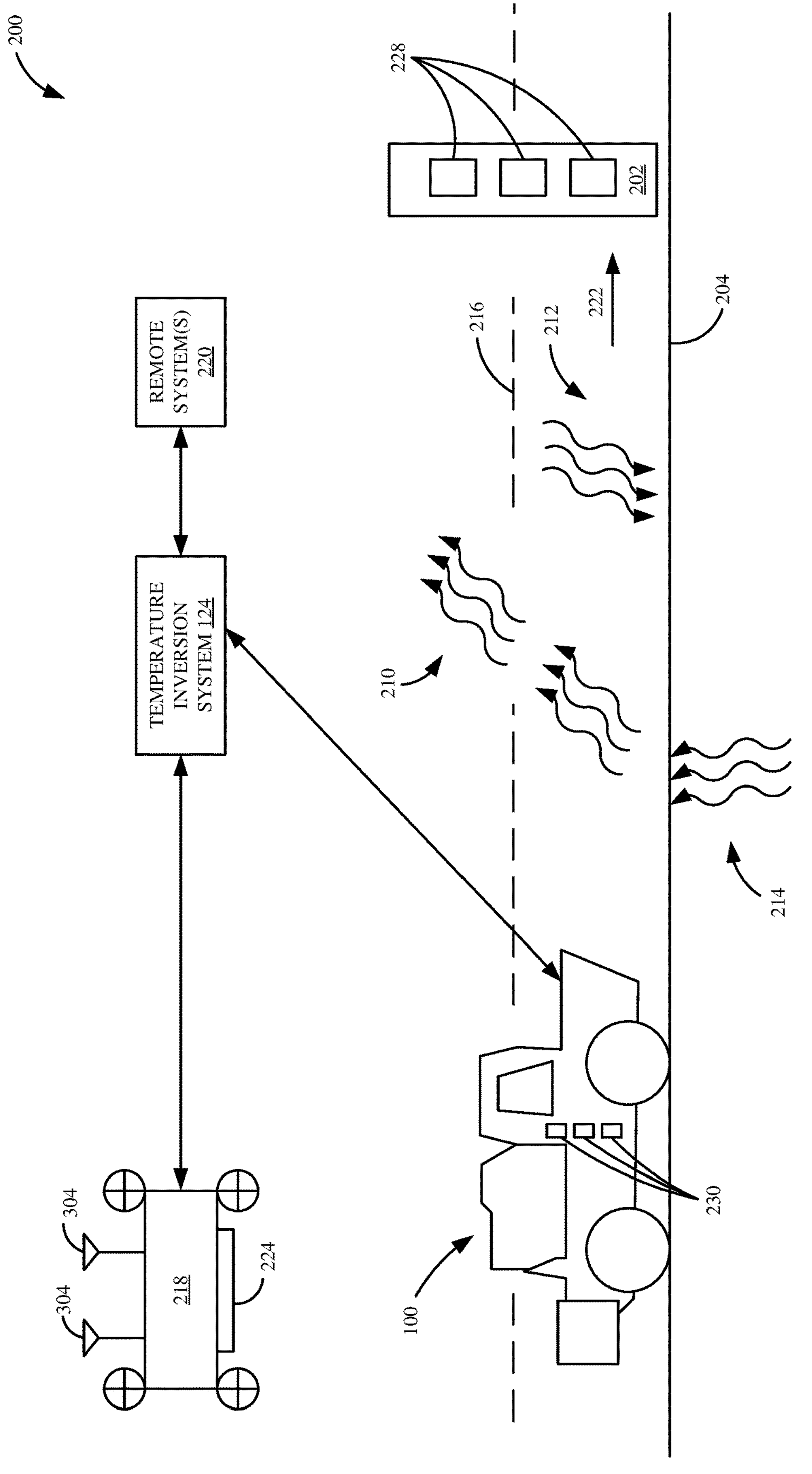

FIGS. 2A-2B are pictorial illustrations showing the sprayer, illustrated in FIG. 1, an unmanned aerial vehicle (UAV) and a ground-based asset deployed at a worksite. This is just one example, and all of these items are not needed. For instance, sprayer 100 may be used without the UAV or ground-based asset. All of them can be used or different combinations can be used. They are all described in FIG. 2 for the sake of example only.

In the illustrated example, worksite architecture 200 includes sprayer 100 configured to spray a substance along ground 204, an unmanned aerial vehicle 218, a ground-based asset 202 and a temperature inversion system 124 configured to detect a presence of a temperature inversion at the worksite. As illustratively shown, sprayer 100 and ground-based asset 202 illustratively include sensors 230 and 228 located at a variety of elevations on sprayer 100 and ground-based asset 202, respectively. However, sensors 230 and 228 may also be implemented as a single movable sensor on sprayer 100 and/or ground-based asset 202 configured to move to a plurality of different heights above ground. Additionally, UAV 218 includes sensor(s) 224 and geographic position sensor(s) 304.

Temperature inversion system 124 is configured to receive sensor signals generated by sensors 230, 224 and/or 228 and detect a presence of a temperature inversion as will be discussed later. Additionally, in one example, temperature inversion system 124 can communicate with remote system(s) 220 to obtain any data that may be used in predicting a temperature inversion and corresponding drift of a substance to be sprayed. This can include weather data (which may include wind speed, cloud coverage data, sunrise time, sunset time, temperatures, etc.), field data which includes elevation, soil type, soil moisture, ground cover, topography and/or positional data of the worksite, and substance data which can include information about the substance to be sprayed.

In order to detect, or predict, a presence of a temperature inversion, certain environmental conditions need to, or will be, present at the worksite. As an example, this will be discussed in the context of worksite architecture 200, but it is to be understood that a temperature inversion may occur anywhere along an agricultural worksite, and there may be a wide variety of other environmental factors that affect whether a temperature inversion will occur. In the example of FIG. 2A, sun 206 provides solar radiation 208 to agricultural worksite 200. Once solar radiation 208 comes into contact with ground 204, solar radiation 208 is absorbed into ground 204 as radiation 226. Additionally, some radiation is re-emitted from ground 204, as terrestrial radiation 210, into the atmosphere and is either lost into space or absorbed by molecules present within the atmosphere and re-emitted to ground 204 as atmospheric radiation 212.

As ground 204 re-emits terrestrial radiation 210, air nearest to ground 204 is warmed and, as such, increases in temperature and expands making it less dense than air above it. As a result, the warmer air nearest to ground 204 begins rising while the cooler, denser air above it begins to sink. Tiny circulation cells are formed as a result. As ground 204 is warmed by solar radiation 208 and re-emitted atmosphere radiation 212, rising columns of warm air transfer more and more heat energy to upper levels of the atmosphere while cooler air is transferred to the surface to be warmed.

Now turning to FIG. 2B, in the absence of sun 206, less or no solar radiation 208 is received by ground 204. As a result, ground 204 begins emitting more terrestrial radiation 210 than it is receiving from atmospheric radiation 212 and/or radiation 214 being conducted into ground 204. Over time, ground 204 will be cooler than the adjacent air above it. As a result, heat from the adjacent air will be conducted into ground 204. As heat is conducted from the air into ground 204, the air next to ground 204 will be colder and denser than the air above it. This is the beginning of a temperature inversion. As time passes, more and more heat energy is conducted from the adjacent air into ground 204 where it will be lost as terrestrial radiation 210. A total height of the cooled air 216 will then increase as more and more heat is conducted into ground 204 and is subsequently lost as terrestrial radiation 210.

In the presence of an air inversion, the colder, denser air will be closest to ground 204 and, with increasing height, an air temperature will increase along with a decrease in air density. This is referred to as a density stratification of the air and occurs as a result of the temperature inversion. During the temperature inversion, air can only primarily move horizontally. This air movement is sometimes called laminar flow. Any sprayed substance from sprayer 100 can thus drift (along with the laminar flow) greater distances within this density stratification as the denser air is adjacent to ground 204. In one example, temperature inversion system 124 can detect a presence of a temperature inversion at worksite 200 and can subsequently generate action signals as will be discussed in greater detail below.

Figure 3A:
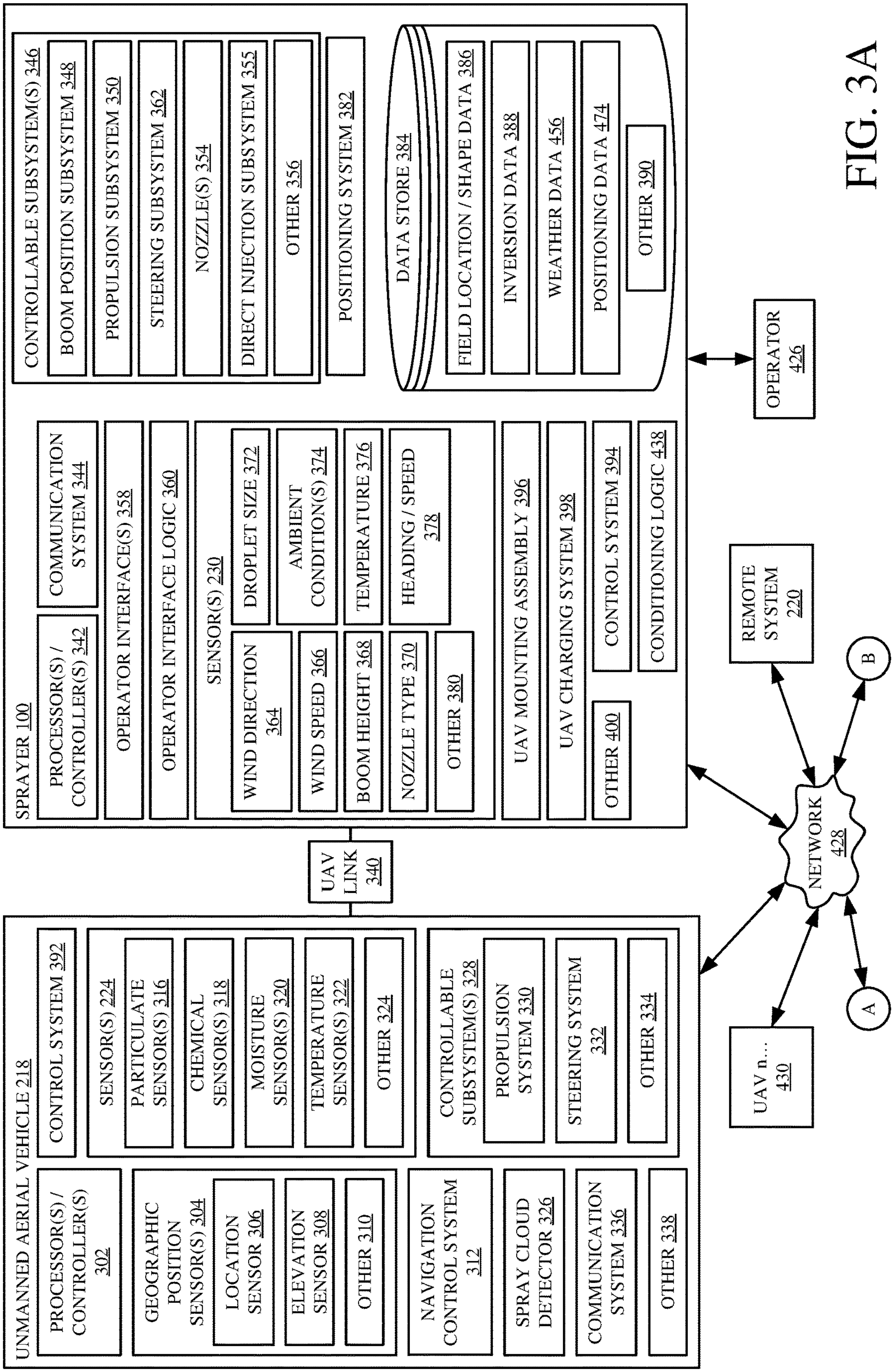
FIGS. 3A-3B are block diagrams of the sprayer, UAV, ground-based asset and temperature inversion system illustrated in FIGS. 2A-2B communicatively coupled over a network.
Figure 3B:
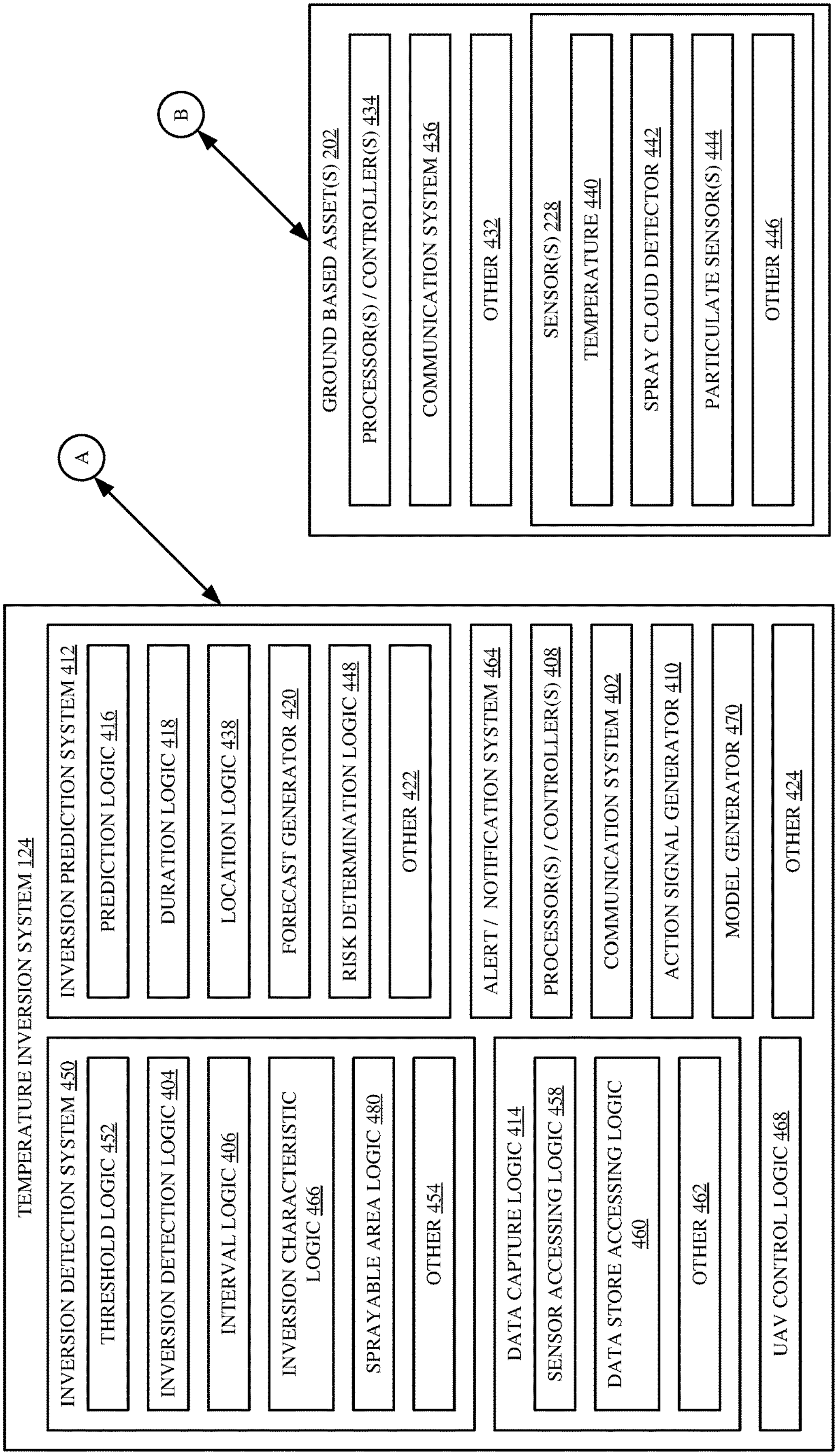

FIGS. 3A and 3B (collectively referred to as FIG. 3) are block diagrams of sprayer 100, UAV 218, ground-based asset 202 and temperature inversion system 124, illustrated in FIGS. 2A-2B, communicatively coupled over a network 428. Again, all of these items are not needed but are described for the sake of example only.

Before describing the operation of temperature inversion system 124 in more detail, a brief description of some of the items in sprayer 100, UAV 218 and ground-based asset(s) 202, and their operation, will first be provided. Network 428 can be any of a wide variety of different types of networks, such as a wide area network, a local area network, a near field communication network, a cellular network, or any of a wide variety of other networks or combinations of networks. Sprayer 100 illustratively includes a communication system 344, a control system 394, controllable subsystem(s) 346, operator interface(s) 358, operator interface logic 360, one or more processor(s)/controller(s) 342, one or more sensor(s) 230, data store 384, positioning system 382, UAV mounting assembly 396, UAV charging system 398, conditioning logic 438, and a wide variety of other items 400.

Control system 394 can generate control signals for controlling a variety of different controllable subsystem(s) 346 based on sensor signals generated by sensor(s) 230, based on feedback received from UAV 218, temperature inversion system 124 and/or ground-based asset(s) 202, based on operator inputs received through operator interface(s) 358, or it can generate control signals in a wide variety of other ways as well. Controllable subsystem(s) 346 can include a wide variety of mechanical, electrical, hydraulic, pneumatic, computer implemented and other systems of sprayer 100 that relate to the movement of the machine, the operation that is performed, and other controllable features. In one example, this includes a boom position subsystem 348 that controls a position of boom 108, a propulsion subsystem 350, a steering subsystem 352, a nozzle(s) subsystem 354 that controls nozzles on boom 108, a direct injection subsystem 355 that varies a concentration of spray adjuvants, among a variety of other subsystem(s) 356.

Communication system 344 can include one or more communication systems that allow sprayer 100 to communicate with remote system 220, UAV 218 and/or UAVs 430, ground-based asset(s) 202, and temperature inversion system 124 over network 428. Operator interface(s) 358 can include display devices, mechanical or electrical devices, audio devices, haptic devices, and a variety of other devices. In one example, operator interface logic 360 generates an operator display on operator interface(s) 358 which can include a display device that is integrated into operator compartment 104 within sprayer 100, or it can be a separate display on a separate device that can be carried by operator 426 (such as a laptop computer, a mobile device, etc.). Positioning system 382 can be one or more of a global positioning system (GPS) receiver, a LORAN system, a dead reckoning system, a cellular triangulation system, or other positioning system.

Sensor(s) 230 generate sensor signals which can be used by temperature inversion system 124 to detect a presence of a temperature inversion at a worksite. Sensor(s) 230 illustratively include a wind direction sensor 364, a wind speed sensor 366, a boom height sensor 368, a nozzle type sensor 370, a droplet size sensor 372, an ambient condition(s) sensor 374, a temperature sensor(s) 376, a heading/speed sensor 378, and a variety of other sensor(s) 380. Wind direction sensor 364 and wind speed sensor 366 are configured to sense a direction and speed of wind at a worksite to be sprayed. Boom height sensor 368 can sense a height of boom 108 on sprayer 100. Nozzle type sensor 370 can sense or indicate a type of nozzle being used on sprayer 100. Droplet size sensor 372 can sense or derive a droplet size (or granule size) of a substance being sprayed by sprayer 100. Ambient condition sensor 374 can sense things such as atmospheric pressure, etc. Additionally, heading/speed sensor 366 can sense a current direction and speed (route) of sprayer 100 as it moves across the worksite to be sprayed. In one example, signals generated by sensor(s) 230 can be conditioned by conditioning logic 438 and provided to control system 394, temperature inversion system 124, and/or any other system. Conditioning logic 438 can include any circuitry that allows for any conditioning of sensor signals which can include filtering, linearization, compensation, amplification, etc.

In one example, sensor(s) 230 can be positioned on sprayer 100 in order to detect a presence of a temperature inversion. For example, temperature sensors 376 can be positioned at different elevations on sprayer 100 to provide an indication of a temperature inversion. As previously mentioned in regards to FIG. 2B, in the presence of a temperature inversion, an air temperature closer to ground 204 will be colder compared to an air temperature located further above ground 204. As such, temperature sensors 376 can be positioned on sprayer 100 to detect air temperatures at different elevations. Signals indicative of the sensed temperatures can be provided to temperature inversion system 124, which can detect a presence of a temperature inversion, as will be discussed in more detail later.

Sprayer 100 also illustratively includes data store 384. Data store 384 can store any or all data pertaining to operation of sprayer 100. In one example, temperature inversion system 124 can use data from data store 384 to predict a future presence of a temperature inversion at a worksite as will be discussed later. This can include field location/shape data 386, prior temperature inversion data 388, weather data 456, positioning data 474 and a variety of other data 390. Field location/shape data 386 can include any or all data pertaining to a topography of a worksite to be sprayed which can include elevation data, shape data, etc. Prior temperature inversion data 388 can include data relating to a past occurrence of a temperature inversion at a worksite. Positioning data 474 can be provided from positioning system 382 and can indicate a current or past position of sprayer 100. Additionally, weather data 456 can include any weather data which can be used to predict a future presence of a temperature inversion. This can include data relating to current or future cloud coverage, humidity, dew point, rain, temperature, etc. at different time periods at the worksite.

Sprayer 100 also includes UAV mounting assembly 396 and UAV charging system 398 that can be used to store and charge UAV 218 and/or UAVs 430 respectively. In one example, UAV 218 and/or UAVs 430 can be used to provide an indication of a temperature inversion to temperature inversion system 124 as will be discussed later. Additionally, UAV 218 and/or UAVs 430 can be coupled to sprayer 100 using UAV link 340. UAV link 340 can include a tethered link or a wireless link. If they are tethered links, they can provide power and control signals as well as other communication signals between UAV 218 and sprayer 100. They can provide similar or different signals if UAV link 340 is a wireless link. All these arrangements are contemplated herein.

Unmanned aerial vehicle (UAV) 218 illustratively includes processor(s)/controller(s) 302, a control system 392, controllable subsystem(s) 328, sensor(s) 224, a navigation control system 312, a spray cloud detector 326, a communication system 336, geographic position sensor(s) 304, and a wide variety of other items 338. Navigation control system 312 can control a position of UAV 218 relative to sprayer 100. Spray cloud detector 326 can detect a droplet suspension in air, or drift, which exceeds a threshold suspension or "hang time." Communication system 336 allows UAV 218 to communicate with sprayer 100, temperature inversion system 124, ground-based asset(s) 202, remote system 220 and/or other UAV(s) 430. Geographic position sensor(s) 304 can include a location sensor 306 (which can be a GPS receiver, a cellular triangulation sensor, a dead reckoning sensor, etc.), an elevation sensor and a variety of other sensors 310. Controllable subsystem(s) 328 are controlled by control system 392 and can include a propulsion system 330, a steering system 332, and other items 334. Sensor(s) 224 can include a particulate sensor 316, a chemical sensor 318, a moisture sensor 320, a temperature sensor 322, and/or other sensors 324.

In operation, UAV 218 can generate and provide an indication of a temperature inversion to temperature inversion system 124. For example, sensor signals from sensor(s) 204 and 304 can be provided to temperature inversion system 124 and used to detect a presence of a temperature inversion. In one example, this includes measuring air temperatures at different elevations using temperature sensor 322 of UAV 218. For instance, UAV 218 can be configured to fly to different elevations at a worksite and measure air temperatures at the respective elevations. An indication can then be generated and provided to temperature inversion system 124 to detect a presence of a temperature inversion. In one example, UAV 218 can be provided with a specific route or destination, and, upon receiving the route or destination, navigation control system 312 can automatically, semi-automatically or manually control UAV 218 to travel along the route to record measurements that can subsequently be communicated to temperature inversion system 124.

In another example, a presence of an air inversion can be detected using spray cloud detector 326. As sprayer 100 is spraying a substance along an area to be sprayed, spray cloud detector 326 can measure a suspension time of the substance within the air. In the presence of an air inversion, air nearest to the ground has a greater density resulting from a decrease in air temperature relative to the air above it. As a result, droplets or granules of the sprayed substance are suspended for a longer period of time compared to a suspension time when no temperature inversion is present. Upon receiving an indication of a suspension time, temperature inversion system 124 can compare the value to a threshold, or to historical or other values, to detect a presence of a temperature inversion. However, other ways to detect a temperature inversion are contemplated herein as well using information obtained from sensor(s) 224 and 304.

In another example, an indication of a temperature inversion can be provided from ground-based asset(s) 202. Ground based asset(s) 202 illustratively includes processor(s)/controller(s) 434, a communication system 436, sensor(s) 228, and a wide variety of other items 432. In one example, ground based asset(s) 202 can be a fixed structure located along a worksite, a ground-based mobile machine located at a worksite, or any other ground-based asset that can provide an indication of a temperature inversion to temperature inversion system 124. Additionally, it is to be understood that in some examples, ground-based asset(s) 202 may be a surface based asset and/or an aerial sprayer. For example, if the worksite to be sprayed is rice paddies, ground-based asset(s) 202 may include floating sensors on water. In this context, sprayer 100 may be a terrestrial, aerial, and/or aquatic sprayer.

In one example, sensor(s) 228 include temperature sensors 440, sprayer cloud detector 442, particulate sensor(s) 444, among other sensors 446. In one example, sensor(s) 228 are positioned on ground based asset(s) 202 so that a presence of a temperature inversion can be detected. This can include positioning temperature sensors 440 at different heights on ground based asset(s) 202 so that air temperatures at different heights can be measured and provided to temperature inversion system 124. Upon receiving the air temperatures at different heights, temperature inversion system 124 can detect a presence of a temperature inversion. In one example, sensor(s) 228 can be located at a height close to ground 204 and a predetermined distance apart in order to measure a difference in air temperature between the elevations indicating a presence of a temperature inversion.

Temperature inversion system 124 illustratively includes an inversion detection system 450, an inversion prediction system 412, data capture logic 414, UAV control logic 468, an alert/notification system 464, processor(s)/controller(s) 408, a communication system 402, an action signal generator 410, a model generator 470, and a variety of other items 424.

Before discussing temperature inversion system 124 in detail, it will be noted that, in one example, sprayer 100 may have its own temperature inversion system 124 which can communicate with one or more UAVs and/or remote system(s) 220. Additionally, parts or all of system 124 can be disposed on sprayer 100, UAV 218, and/or ground-based asset(s) 202. For purposes of the present discussion, it will be assumed that system 124 is a central system that is capable of communicating with sprayer 100, UAV 218, ground-based asset 202 and/or remote system 220.

In operation, temperature inversion system 124 is configured to detect and/or predict a presence of a temperature inversion at a worksite being sprayed (or to be sprayed). Upon detecting or predicting a presence of a temperature inversion, action signals are generated and used to generate a user interface display and/or modify an operating characteristic of sprayer 100, UAV 218, ground-based asset(s) 202, etc.

Data capture logic 414 includes sensor accessing logic 458, data store accessing logic 460, and other logic 462. Sensor accessing logic 458 can be used to obtain sensor data (or values indicative of the sensed variables) provided from any or all of sensor(s) 224, 304, 230, and/or 228 that can be used to detect and/or predict a presence of a temperature inversion. In one example, sensor accessing logic 458 receives an indication of a temperature inversion as a set of temperature signals generated by accessing a temperature sensor on UAV 218, sprayer 100, ground-based asset 202, or other sources.

Additionally, data store accessing logic 460 can be used to obtain stored data from data store 384 and/or data from remote system 220 in order to detect and/or predict a presence of a temperature inversion. For example, this can include weather data for a worksite area, data relating to chemical properties of a substance to be sprayed, topographical information, etc.

Upon receiving sensor data or indications of the sensed variables, inversion detection system 450 can detect a presence of a temperature inversion at a worksite. Inversion detection system 450 includes inversion detection logic 404, threshold logic 452, interval logic 406, inversion characteristic logic 466, sprayable area identification logic 480, and other logic 454. Interval logic 406 can periodically or routinely obtain sensor data or indications of the sensed variables using data capture logic 414. In one example, interval logic 406 can use data capture logic 414 prior to initiating a spraying operation or throughout a spraying operation. Regardless, in one example, threshold logic 452 can compare a difference between the obtained sensor data or indications thereof to a threshold value. Based on the comparison, inversion detection logic 404 can detect a presence or absence of a temperature inversion at a worksite.

If a temperature inversion is present, inversion characteristic logic 466 can determine characteristics of the inversion.

This can include a temperature inversion intensity, likely duration, and/or inversion height in some examples. Additionally, sprayable area identification logic 480 can identify a geographic location in the worksite where a temperature inversion is not present, and generate a recommendation to spray the substance at the identified geographic location. For example, based on received sensor data or indications of the sensed variables, sprayable area identification logic 480 can identify geographic locations at the worksite where no temperature inversion is present. A recommendation can then be provided to operator 426 on operator interface(s) 358, for example, identifying those areas as areas where spraying is recommended. It can be provided on a map, as a recommended route, etc.

For the purposes of the present discussion, it will be assumed that the received sensor data is a plurality of air temperature measurements taken at different elevations. It will be noted, however, that a variety of other data can be obtained and used to detect a presence of a temperature inversion. Upon receiving the plurality of air temperature measurements, a difference is first measured between an air temperature measurement located at a particular elevation above a ground-surface and an air temperature measurement located nearest the ground-surface. By example only, this can include subtracting an air temperature measurement taken 6-12 inches above a soil surface from an air temperature measurement taken 8-10 feet above the soil surface. In the presence of a temperature inversion, an air temperature nearest to the ground will be lower compared to an air temperature at a higher elevation relative to the ground. As a result, a positive difference between the plurality of air temperature measurements can indicate a presence of an air temperature inversion. Additionally, the greater the positive temperature difference, the more intense the air temperature inversion and subsequently the more stable the lower atmosphere (e.g. the stronger the laminar flow will be).

Upon determining a positive difference between the air temperature measurements taken at varying elevations, the difference can then be compared to a threshold value by threshold logic 452. Based on the comparison, inversion detection logic 404 can determine whether a temperature inversion is present at the worksite. Comparing to a threshold value is only one example and determining whether the positive difference represents an actionable temperature inversion can be done in other ways as well.

Also, it is expressly contemplated that other sensor data and information can be used as well to detect a presence of a temperature inversion. For example, sensor data obtained from a spray cloud detector located on UAV 218, sprayer 100 and/or ground-based asset(s) 202 can be used to detect a presence of a temperature inversion at a worksite. During a temperature inversion, an increased density of air located proximate to a ground-surface leads to an increased suspension time of a sprayed substance compared to an absence of a temperature inversion. As a result, threshold logic 452 can compare data obtained from a spray cloud detector to a threshold, and, based on the comparison, inversion detection logic 404 can detect a presence of a temperature inversion at a worksite.

Additionally, historical temperature inversion data can also be used to detect a presence of a temperature inversion at the worksite. For example, sensor data from UAV 218, sprayer 100, and/or ground asset(s) 202 can indicate certain weather conditions present at a worksite. This can include received sensor data from temperature sensors, wind speed and direction sensors, moisture sensors, among a variety of other sensor data. Upon detecting a presence of certain environmental conditions, inversion detection logic 404 can compare the conditions to previously stored weather data where it was determined that a temperature inversion was present. Based on the comparison, inversion detection logic 404 can detect a likely current presence of a temperature inversion at a location in a worksite, even though the actual temperature difference at that location has not been sensed. Additionally, a variety of other ways to detect a presence of a temperature inversion at a worksite are contemplated as well.

Upon detecting a presence of a temperature inversion at a worksite, inversion detection logic 404 can generate a temperature inversion output indicative of the presence of the temperature inversion. The temperature inversion output can then be provided to action signal generator 410 of temperature inversion system 124. Based on the received temperature inversion output, action signal generator 410 generates action signals to take any of a wide variety of actions, such as to generate a user interface display indicating the presence of the temperature inversion and/or generate control signals to modify an operating characteristic of sprayer 100, UAV 218, ground-based asset(s) 202, etc. In one example, temperature inversion system 124 can include alert/notification system 464 to generate alerts to operator 426 if a temperature inversion is present. Additionally, alerts can be communicated to remote system 220 which can include any remote computing system.

By way of example, action signals can be provided to operator interface logic 360 of sprayer 100 to generate a display on operator interface(s) 358. In one example, the generated display can indicate a presence of a detected temperature inversion. Additionally, a generated display can include directions to another location within a worksite to be sprayed that does not have a temperature inversion present. Further, the display can include characteristics of the detected temperature inversion and/or an expected duration of the temperature inversion. A variety of other information relating to the detected presence of the temperature inversion can be displayed as well.

Action signals can also be provided to control system 394 to control controllable subsystem(s) 346 of sprayer 100. This can include raising or lowering boom 108, deactivating/activating specific nozzles 354, adjusting a spray droplet size, adjusting chemical composition of the spray, etc. Additionally, if a severe temperature inversion is detected, all nozzles 354 can be deactivated until it is determined that a temperature inversion is no longer present. Additionally, action signals can be provided to UAV control logic 468. Upon receiving action signals, UAV control logic 468 can control UAV 218 to travel to a plurality of different elevations at the agricultural worksite to generate sensor signals indicative of a temperature inversion. In one example, the generated sensor signals are indicated of an air temperature at each of the plurality of elevations at an agricultural worksite. However, it is also expressly contemplated that UAV control logic 468 can control UAV 218 in the absence of a received action signal as well. For example, operator 426 can provide a user input requesting UAV 218 travel to a plurality of worksite areas to detect a presence of a temperature inversion. In that case, spraying can continue of areas of the worksite where no temperature inversion is present, even though a temperature inversion may be present in other areas of the worksite. However, other control signals can be provided to UAV 218 as well.

Besides detecting a current presence of a temperature inversion, temperature inversion system 124 can also predict a future presence of a temperature inversion at a worksite.

For example, temperature inversion system 124 includes inversion prediction system 412. Inversion prediction system 412 includes prediction logic 416, duration logic 418, location logic 438, a forecast generator 420, risk determination logic 448, and other logic 422. In one example, inversion prediction system 412 can obtain various types of temperature inversion data using data capture logic 414 to predict whether a temperature inversion will occur, where it will occur, and when. This can include weather data, substance data relating to chemical properties of a substance to be sprayed, topographical information, etc. Data can be stored at data store 384 or be provided from remote system 220 which, in one example, can be public or private data stores.

In one example, prediction logic 416 receives temperature inversion data indicative of a future presence of a temperature inversion. This can include weather data, chemical property data for the substance to be sprayed and/or topographical data relating to a worksite to be sprayed, among other data. Based on the received temperature inversion data, prediction logic 416 can predict a future presence of a temperature inversion. For example, received weather data can indicate weather conditions under which a temperature inversion is likely to occur. This can include data regarding cloud coverage (where maximum terrestrial radiation is lost to space), wind, air temperatures, among other factors. Additionally, received elevation data and chemical property data can further indicate whether a temperature inversion will be present and the chance of substance drift. Prediction logic 416 can then generate a prediction output based on determining a future presence of a temperature inversion, and when it is likely to begin.

In one example, duration logic 418 receives the prediction output from prediction logic 416 and can determine an estimated duration of time the expected temperature inversion will be present at the identified locations in the worksite. This can include determining a sunset, a sunrise and/or an expected time when enough solar radiation will be present to eliminate the presence of a temperature inversion at the worksite. This information can be obtained using data capture logic 414 and can include weather data, topography data, etc. Upon determining a duration the temperature inversion, a duration output can be generated by duration logic 418.

Additionally, location logic 438 can receive the prediction output from prediction logic 416 and can determine at least one worksite area where the predicted future presence of the temperature inversion will occur. In one example, this can include analyzing the weather data, topological data, historical data, (among other things), and determining areas in a worksite where the conditions will be present. This can be determined based on cloud coverage data, temperature data, etc. Once at least one worksite area is identified, location logic 438 can generate a location output based on the worksite area identified.

In one example, forecast generator 420 receives the prediction output, the duration output and the location output and generates a temperature inversion forecast based on the received outputs. The generated forecast can then be provided on operator interface(s) 358 to operator 426. In this example, operator 426 can make an informed decision about when and where to spray the substance over the worksite area.

Further, a map or route can be automatically generated. In one example, the map or route can be generated by forecast generator 420 upon generating the forecast. The map or route may identify times when different areas are safe to spray, based on the prediction and characteristics of the substance to be sprayed. The map or route can be output for operator 426, or used to automatically route sprayer 100. It may do so to avoid spraying in areas where temperature inversions are present.

Additionally, risk determination logic 448 can determine a risk of substance drift based on the generated forecast and chemical properties of the substance to be sprayed. For example, when a liquid substance is sprayed from nozzle(s) 354, larger drops with greater fall velocities strike the surface within one to three seconds. However, smaller droplets (200 microns in diameter or less) may float along with the air for long distances within the temperature inversion. An evaporation rate of the substance then determines how far a droplet can drift. Therefore, based on the chemical properties of the substance to be sprayed, operational data and the generated forecast, risk determination logic 448 can determine a likelihood of substance drift in different areas, and how that risk changes over time, given the prediction. A display can then be provided to operator 426 on operator interface(s) 358.

Temperature inversion system 124 also includes model generator 470 configured to generate a model of a worksite to be sprayed. In one example, the model can include an indication of when and where a temperature inversion is likely, at the worksite. Additionally, model generator 470 can update the model periodically or intermittently either prior to or throughout a spraying operation. The output of the generated model (which indicates current or likely temperature inversions) can be provided to operator 426 on operator interface(s) 358 or to remote system 220.

Figure 4:
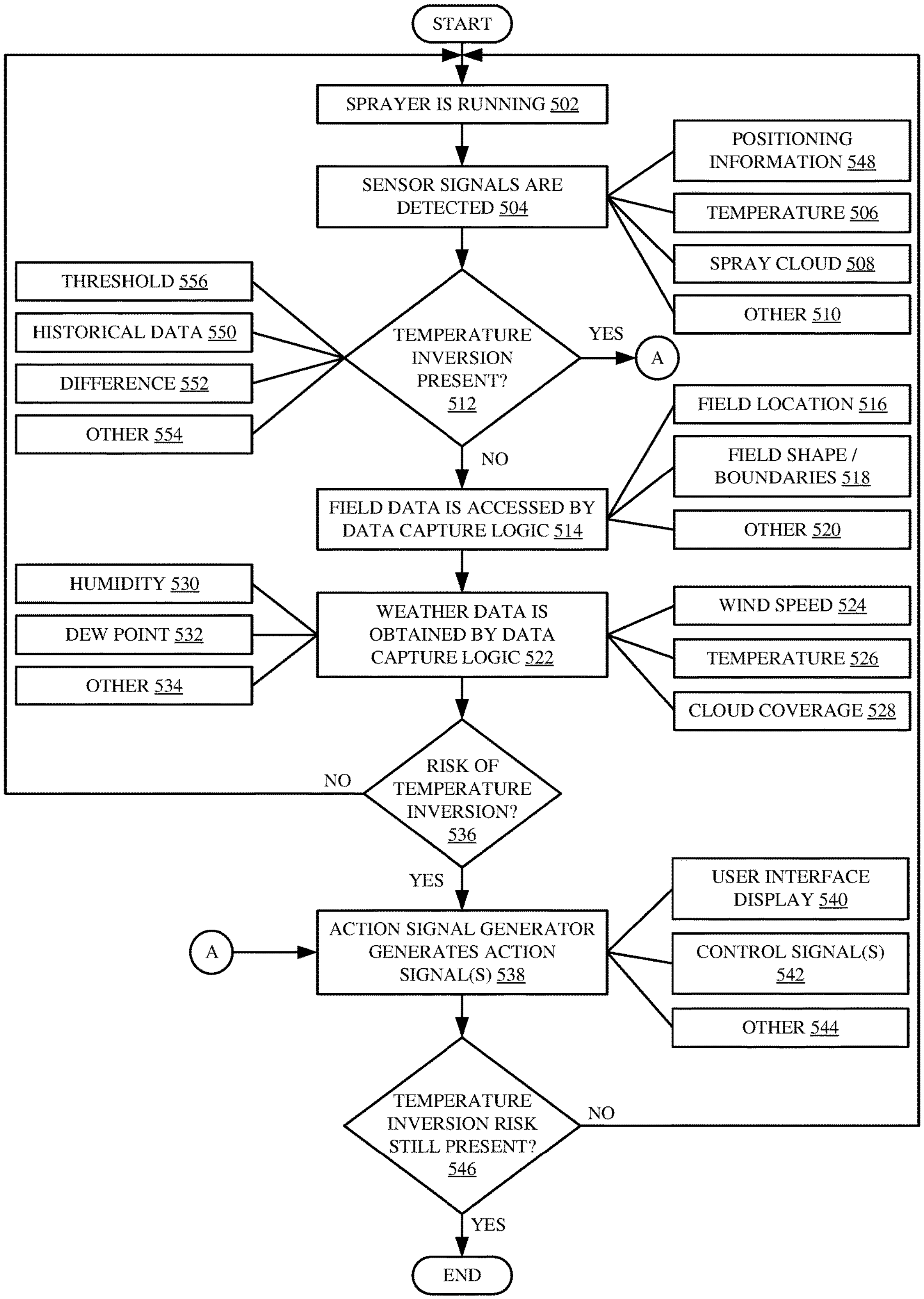
FIGS. 4-6 are flow diagrams showing example operations of a temperature inversion system illustrated in FIGS. 3A-3B.
Figure 5:
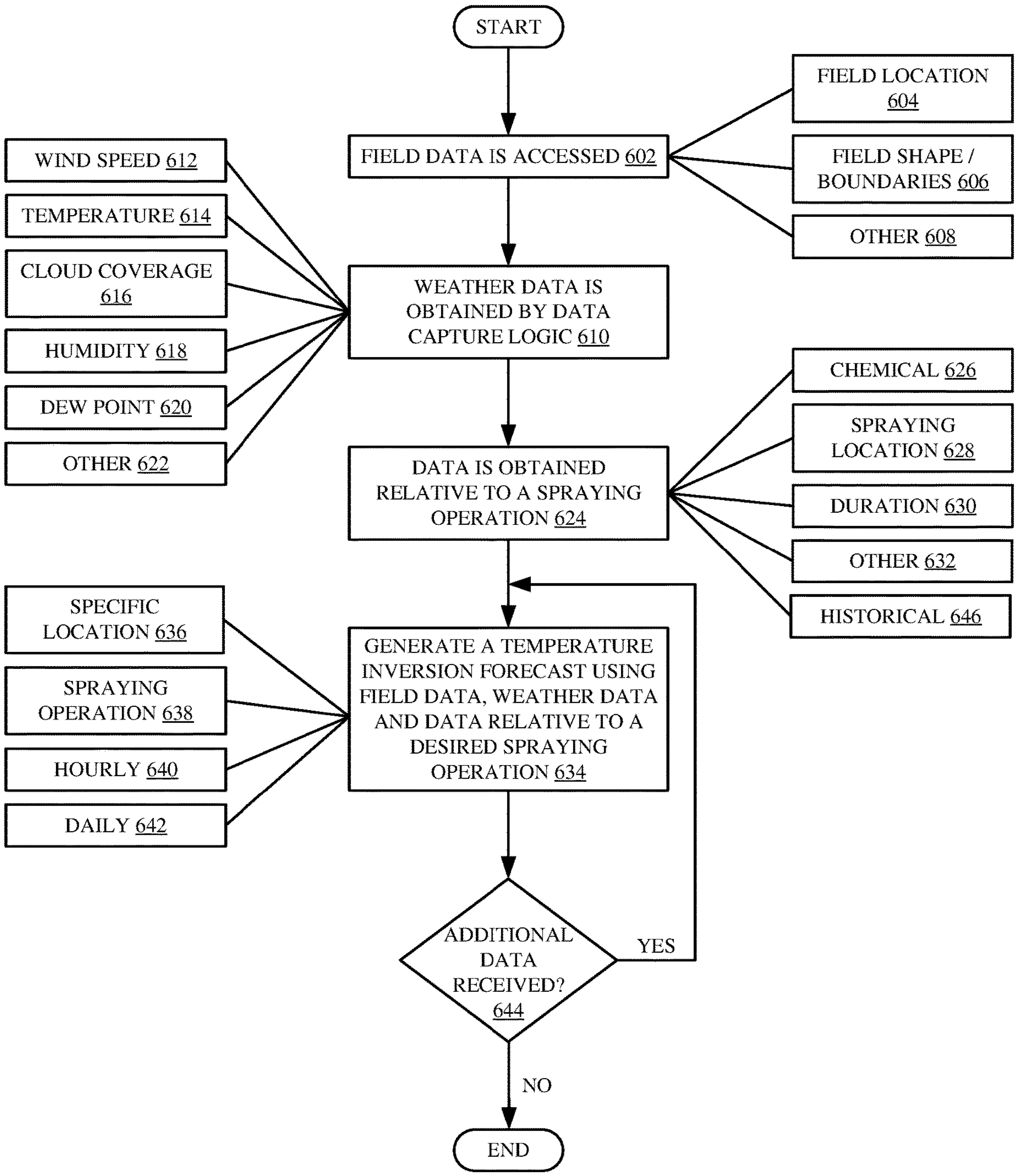
Figure 6:
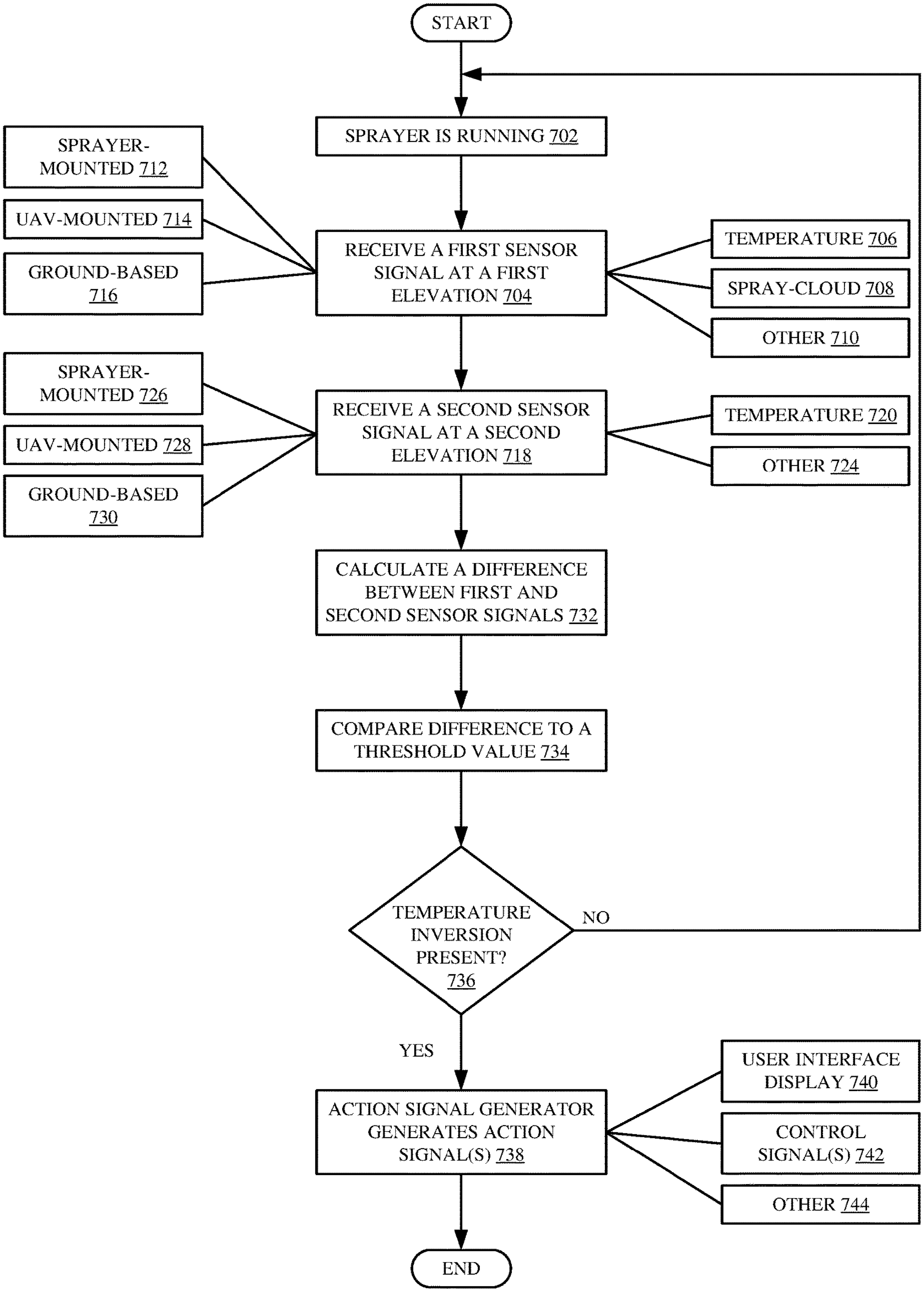

FIGS. 4-6 are flow diagrams showing example operations of a temperature inversion system illustrated in FIG. 3. The operation shown in FIG. 4 is one example of the operation of the system shown in FIG. 3 in detecting and/or predicting a presence of a temperature inversion at a worksite. While it is discussed in the context of gathering data related to a temperature sensor, spray cloud detector and/or positioning system, additional or different data can also be gathered as well. Additionally, it is to be understood that the operation can be carried out at any time or at any point throughout a worksite operation, or even if a worksite operation is not currently underway. Further, while the operation will be described in accordance with sprayer 100, it is to be understood that other mobile machines with a temperature inversion system 124 can be used as well.

It is initially assumed that sprayer 100 is running, as indicated by block 502. This can be done in a variety of ways. For instance, operator 426 can provide initial machine settings based on a worksite operation. The operator can input these settings based upon his or her own prior experience and knowledge. The settings can be made manually, such as through mechanical or other input mechanisms, or they can be made automatically by sprayer 100 itself, or they can be input in a different way, such as through a touch screen or other user input mechanism.

During operation of sprayer 100, sensor signals are received from sensor(s) 230 as indicated by block 504. However, sensor signals can also be received from sensor(s) 224 and/or 304 of UAV 218, sensor(s) 228 of ground-based asset(s) 202, or any other sensors of other systems on mobile machines. Sensor signals may include positioning information, as indicated by block 548. In one example, sensor signals are generated by temperature sensors 376 located at different elevations on sprayer 100, as indicated by block 506. By way of example only, this could include receiving sensor signal(s) from a temperature sensor positioned 6-36 inches above a soil surface and a temperature sensor positioned 8-10 feet above a soil surface on sprayer 100. Alternatively, or in addition, sensor signals can be received from spray cloud detector 326 as indicated by block 508. While spray cloud detector 326 is shown in FIG. 3 to be within UAV 218, it is contemplated that spray cloud detector 326 may be coupled to sprayer 100, ground-based asset(s) 202, or any other mobile machine. Sensor signal(s) received from spray cloud detector 326 can indicate a suspension time of a sprayed substance which can be used to detect a presence of a temperature inversion. Additionally, sensor signals can be received from positioning system 382 indicating a position of sprayer 100. However, signals can be received from other sensors that generate other sensor signals as indicated by block 510.

Upon receiving sensor signals, processing turns to block 512 where a presence of a temperature inversion is detected based upon the received sensor signals. In one example, temperature inversion system 124 can receive the sensor signals or indications of the sensor signals and can detect a presence of a temperature inversion at a worksite. This can include calculating a difference between the sensor signals as indicated by 552. For example, a difference between air temperature measurements taken by temperature sensors 376 located at different heights can be used to indicate a presence of a temperature inversion. Additionally, a comparison of sensor signals or a difference between sensor signals can be compared to a threshold value to indicate a presence of a temperature inversion. This is indicated by block 556. Alternatively, temperature inversion system 124 can use sensor signals and historical data to detect a presence of a temperature inversion. This is indicated by block 550. For example, upon determining that certain environmental conditions are present from received sensor signals, temperature inversion system 124 can compare the environmental conditions to historical data to determine whether or not a temperature inversion is likely present. However, detecting a presence of a temperature inversion can be done in a variety of other ways as well. This is indicated by block 554.

If a temperature inversion is detected, processing proceeds to block 538 where action signal generator 410 generates an action signal. However, if a presence of a temperature inversion is not detected, processing proceeds to block 514 where data capture logic 414 of temperature inversion system 124 obtains field data for a worksite area to be sprayed. In one example, the obtained field data can indicate a location to be sprayed, as indicated by block 516, a field shape/boundary, as indicated by block 518, or any other field data relating to a worksite as indicated by block 520. Upon receiving the field data, data capture logic 414 obtains weather data for the worksite as indicated by block 522. Weather data can include a wind speed, as indicated by block 524, an air temperature as indicated by block 526, cloud coverage, as indicated by block 528, humidity, as indicated by block 530, a dew point, as indicated by block 532, among a variety of other weather data as indicated by block 534.

Processing then turns to block 536 where a future presence of a temperature inversion is predicted by temperature inversion system 124. For example, based on the obtained field data and weather data, prediction logic 416 of temperature inversion system 124 can predict a future presence of a temperature inversion. This can include determining a sunset (where no or less solar radiation is present), wind speeds, cloud coverage, etc. If no future presence of a temperature inversion is predicted, processing proceeds back to block 504 where sensor signals are received. However, if a future presence of a temperature inversion is predicted, processing turns to block 538 where action signal generator 410 generates action signals.

In one example, action signals can be used to generate a user interface display, as indicated by block 540, to control a subsystem of sprayer 100, as indicated by block 542, or in other ways as indicated by block 544. A generated user interface display can be on operator interface(s) 358 and indicate a presence, or a future presence, of a temperature inversion at a worksite to be sprayed. Additionally, the user interface display can also display a route to a different worksite area to be sprayed where no temperature inversion is present. However, other user interface displays can be generated as well.

Control signal(s) can be used to modify an operating characteristic of sprayer 100. For example, a control signal can be generated and provided to controllable subsystem(s) 346 of sprayer 100 which can include boom position subsystem 348, propulsion subsystem 350, steering subsystem 352 and/or nozzle(s) 354 among other subsystems 356. Additionally, control signals can control a subsystem of UAV 218, ground-based asset(s) 202, or other mobile machines. By way of example, a control signal can be provided to UAV 218 so that UAV 218 travels to a different worksite area to be sprayed in order to determine a presence of a temperature inversion. Based on a detected presence or absence of a temperature inversion, an operator 100 can be notified or automatically rerouted, etc.

Processing then turns to block 546 where it is determined whether a temperature inversion is currently, or is predicted to be, present at a worksite area to be sprayed, or whether there is still a substantial risk that one will develop. If a temperature inversion is not present, and the risk of one occurring is low, processing reverts backs to block 502 where sprayer 100 is running. However, if the risk is still present after action signal generator generates action signals, processing subsequently ends.

FIG. 5 is one example of generating a temperature inversion forecast for a worksite area to be sprayed. Processing begins at block 602 where data capture logic 414 of temperature inversion system 124 obtains field data relating to a worksite area to be sprayed. In one example, data capture logic 414 obtains data relating to a field location, as indicated by block 604, a field shape/boundary/topography, as indicated by block 606, or any other data pertaining to the worksite area to be sprayed as indicated by block 608. Upon obtaining field data, data capture logic 414 of temperature inversion system 124 obtains weather data for the worksite area to be sprayed as indicated by block 610. Weather data can include a wind speed, as indicated by block 612, an air temperature, as indicated by block 614, cloud coverage, as indicated by block 616, humidity, as indicated by block 618, a dew point, as indicated by block 620, and other weather data as indicated by block 622.

Processing then turns to block 624 where data capture logic 414 obtains data relating to a spraying operation to be conducted at the worksite area to be sprayed. Operational data can include chemical data relating to the substance to be sprayed, as indicated by block 626, a spraying location, as indicated by block 628, a duration of time the substance is to be sprayed, as indicated by block 630, historical data pertaining to a spraying operation, as indicated by block 646, and other data as indicated by block 632. In one example, field data, weather data, and/or operational data can be obtained from data store 384 of sprayer 100. However, it is contemplated that any or all of the data can also be obtained from remote system 220 using data capture logic 414.

Based on the obtained data, forecast generator 420 of temperature inversion system 124 generates a temperature inversion forecast based on the field data, weather data and operational data pertaining to a desired spraying operation as indicated by block 634. In one example, a user interface display is generated on operator interface(s) 358 indicative of the generated forecast. However, the temperature inversion forecast can also be provided to remote system 220. In one example, the temperature inversion forecast is specific to a particular worksite area to be sprayed, as indicated by 636. However, a forecast can also be generated for all worksite areas to be sprayed during an entire spraying operation as indicated by block 638. It is also contemplated that a temperature inversion forecast can be an hourly forecast, as indicated by block 640, or a daily forecast, as indicated by block 642, or another type of forecast.

Processing then turns to block 644 where temperature inversion system 124 determines whether any additional data relating to a temperature inversion is received. If yes, processing proceeds to block 634 where a forecast is generated based on the obtained data. However, if no additional data is received, processing subsequently ends.

FIG. 6 is one example of detecting a temperature inversion using temperature inversion system 124. Processing begins at block 702 where it assumed that sprayer 100 is currently running. A first sensor signal is received from a sensor located at a first elevation. In one example, the sensor is a temperature sensor, as indicated by block 706. However, the sensor can be any other sensor as indicated by block 710. The sensor can be sensor 230 located on sprayer 100, as indicated by block 712, sensor(s) 224 and/or 304 located on UAV 218, as indicated by block 714, or sensor(s) 228 located on ground-based asset(s) 202, as indicated by block 716.

Processing then turns to block 718 where a second sensor signal is received from a sensor at a second elevation. The sensor can be a temperature sensor, as indicated by block 720, or any other sensor as indicated by block 724. In one example, the sensor is sensor(s) 230 located on sprayer 100, as indicated by block 726, sensor(s) 224 and/304 located on UAV 218, as indicated by block 728, or sensor(s) 228 located on ground-based asset(s) 202 as indicated by block 730.

Temperature inversion system 124 then proceeds to calculate a difference between the first and second sensor signals received at a first and a second elevation, respectively, as indicated by block 732. In one example, a sensor signal obtained from a lower elevation is subtracted from a sensor signal obtained from a higher elevation. This can include subtracting an air temperature measurement recorded at a lower elevation from an air temperature measurement recorded at a higher elevation. Based on the difference, processing proceeds to block 734 where the calculated difference is compared to a threshold (or other) value by threshold logic 452. Based on the comparison, a determination can be made by inversion detection logic 404 whether a temperature inversion is present as indicated by block 736. If no temperature inversion is present, processing proceeds back to block 704 where a first sensor signal is again received at a first elevation.

However, if a temperature inversion is detected, processing proceeds to block 738 where action signal generator 410 generates action signal(s). Action signals can be used to generate a user interface display, as indicated by block 740, control signal(s) 742, among other signals as indicated by block 744. A user interface display (or audio or haptic interface) can be generated on operator interface(s) 358 to notify operator 426 of the detected temperature inversion. Additionally, control signals can be generated by control system 394 to modify an operating characteristic of sprayer 100. For example, this can include generating a control signal to controllable subsystem(s) 346 which can include boom position subsystem 348, propulsion subsystem 350, steering subsystem 352, nozzle(s) 354, and other subsystems 356. Processing then subsequently ends.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
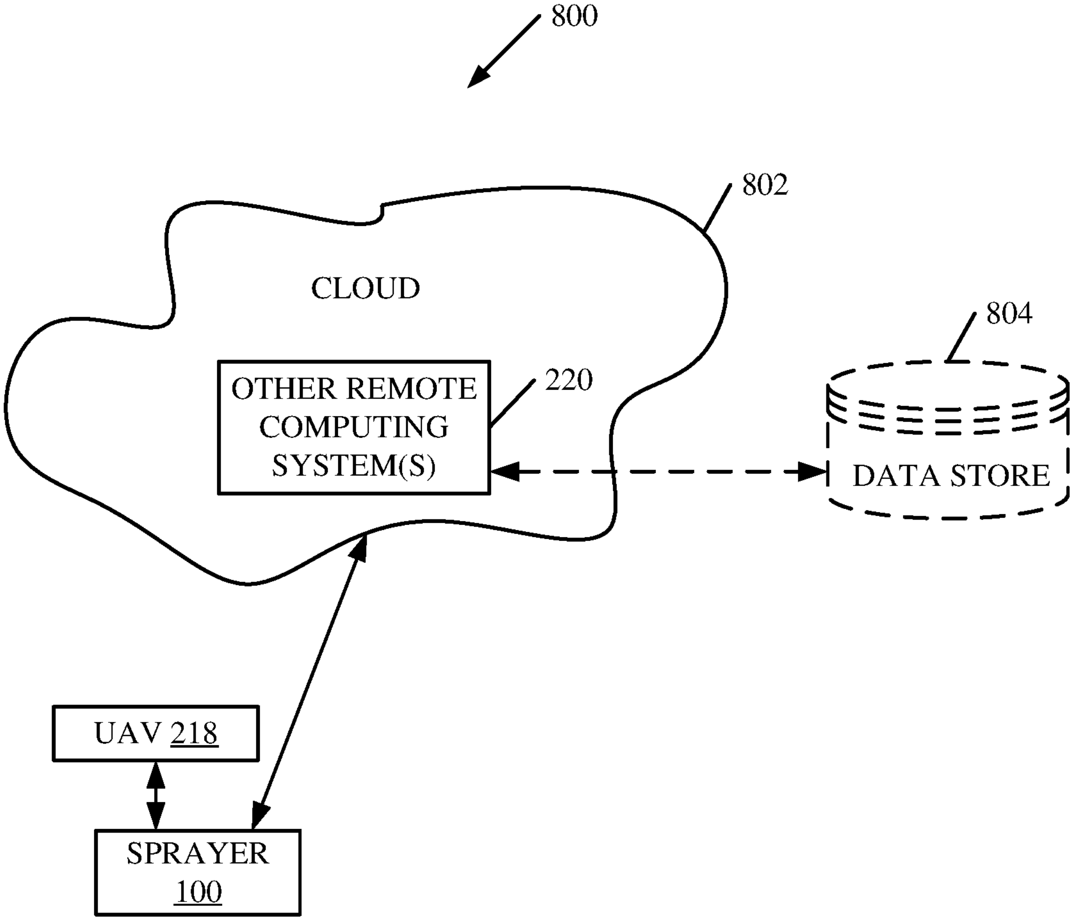
FIG. 7 is a block diagram showing the architecture illustrated in FIGS. 3A-3B deployed in a remote server computing environment.

FIG. 7 is a block diagram of sprayer 100, shown in FIG. 3, except that it communicates with elements in a remote server architecture 800. In an example remote server architecture 800 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 3 and they are similarly numbered. FIG. 7 specifically shows that remote systems 220 can be located at a remote server location 802. Therefore, sprayer 100 accesses those systems through remote server location 802.

FIG. 7 also depicts another example of a remote server architecture. FIG. 7 shows that it is also contemplated that some elements of FIG. 3 are disposed at remote server location 802 while others are not. By way of example, data store 804 can be disposed at a location 802 or separate from location 802, and accessed through the remote server at location 802. Regardless of where they are located, they can be accessed directly by sprayer 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the sprayer comes close to the fuel truck for fueling, the system automatically collects the information from the sprayer using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. Additionally, in some examples, remote systems 220 can obtain relevant data pertaining to a temperature inversion from data store 804 and can provide the data to temperature inversion system 124. This can include weather data, field data, and/or data relating to a spraying operation. However, other data can be obtained as well. All of these architectures are contemplated herein. Further, the information can be stored on the sprayer until the sprayer enters a covered location. The sprayer, itself, can then send the information to the main network.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
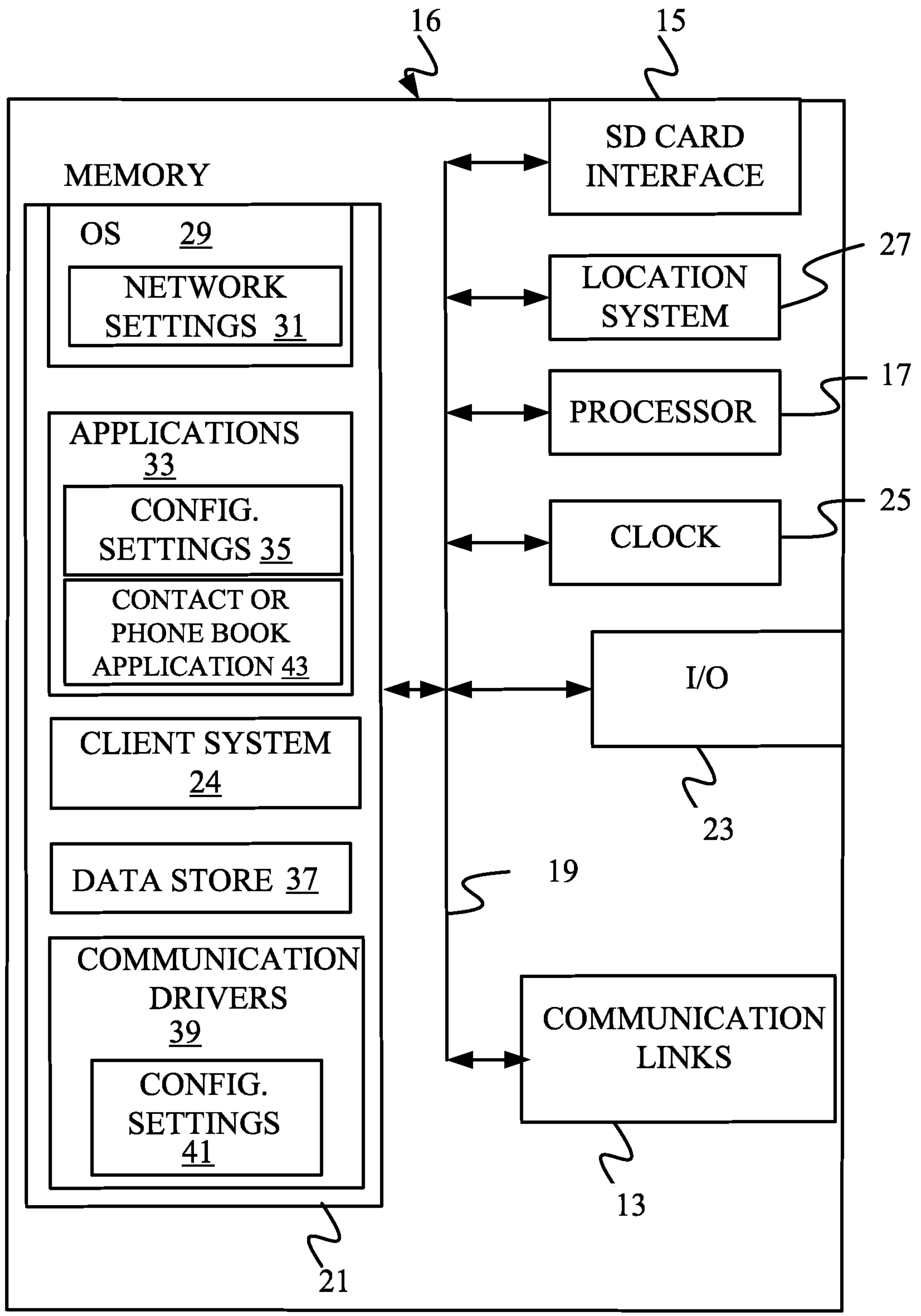
FIGS. 8-10 show examples of mobile devices.
Figure 9:
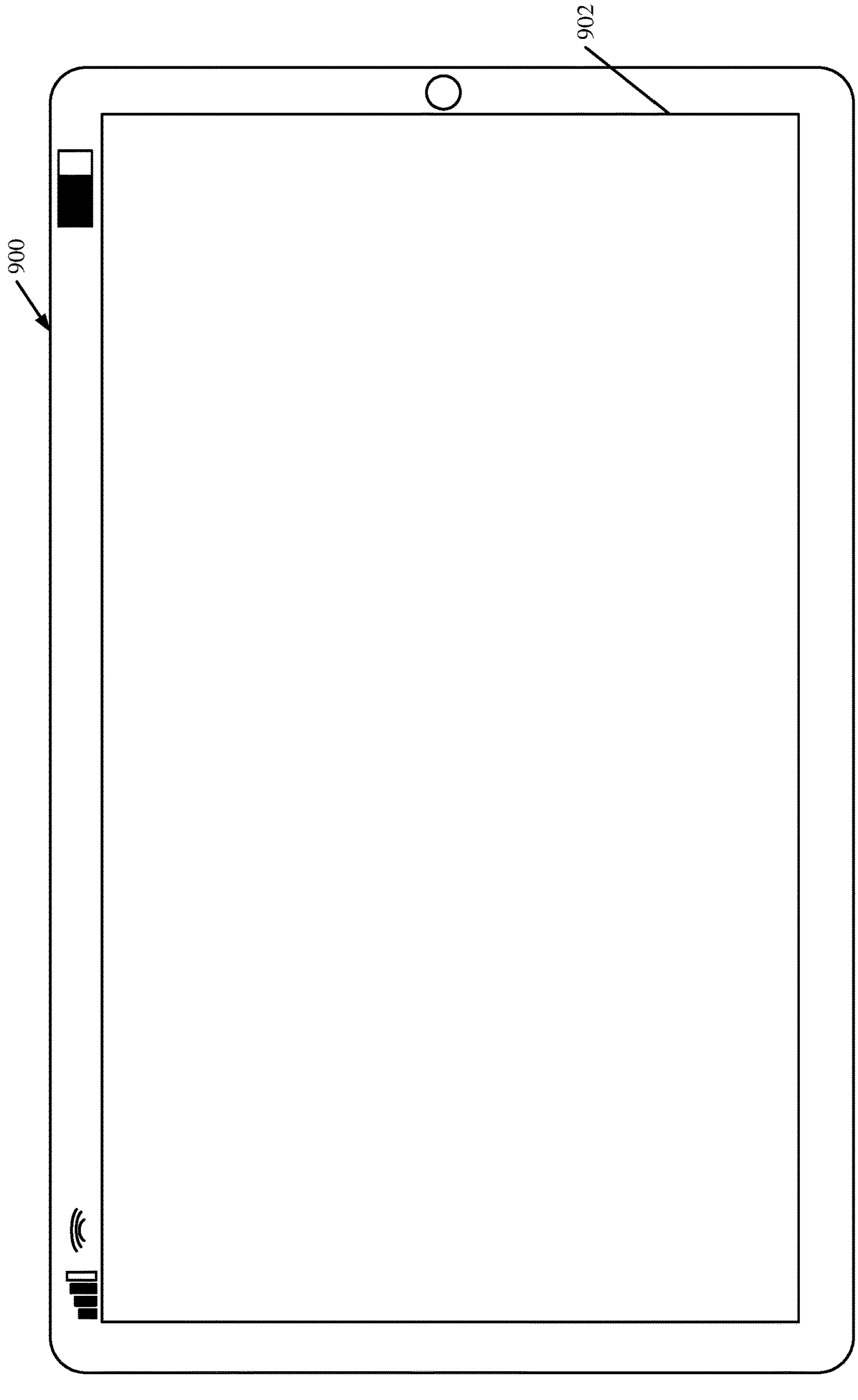
Figure 10:
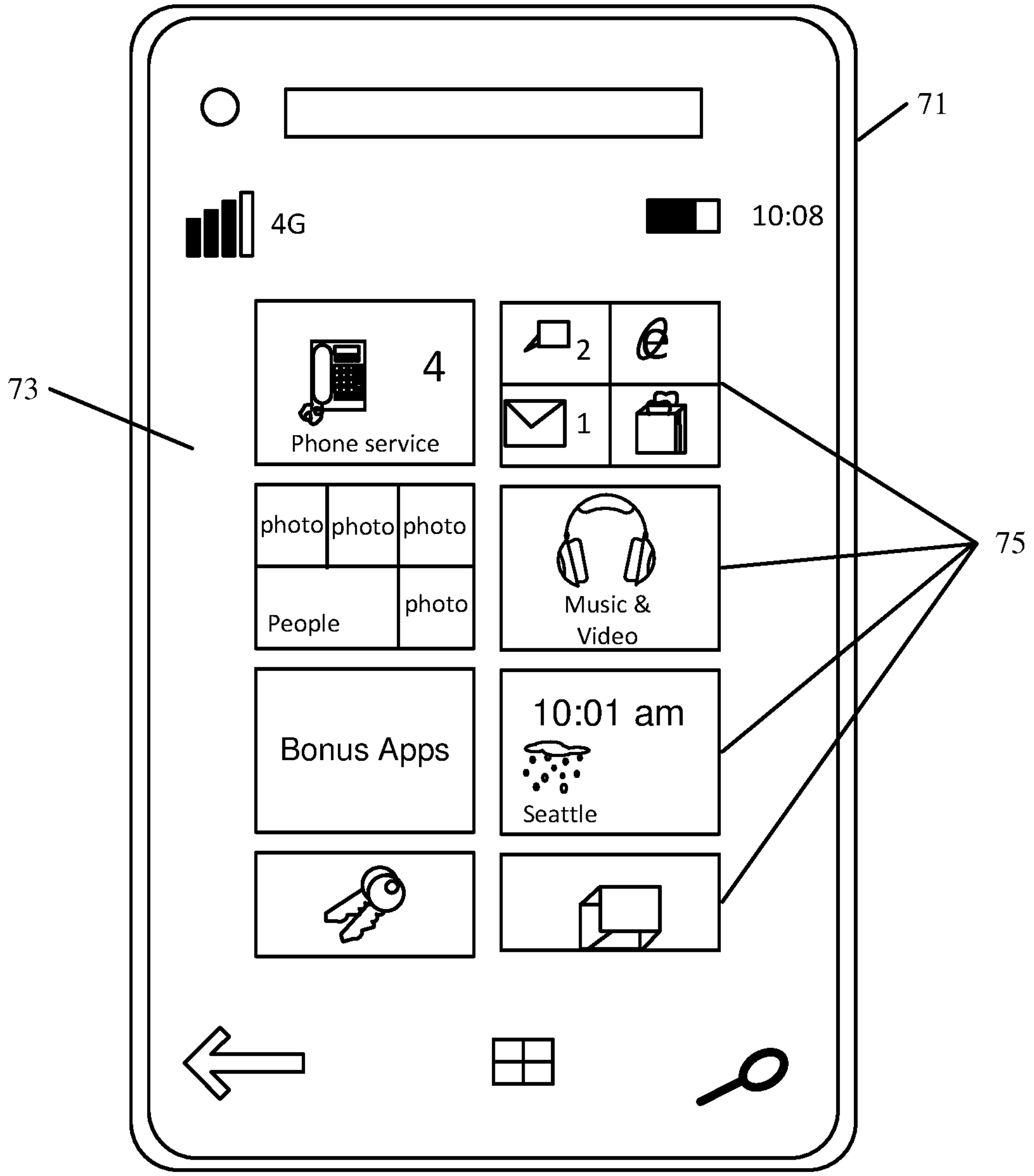

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of sprayer 100 for use in generating, processing, or displaying the overspray data and position data. FIGS. 9-10 are examples of handheld or mobile devices.

FIG. 8 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 900. In FIG. 9, computer 900 is shown with user interface display screen 902. Screen 902 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 900 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
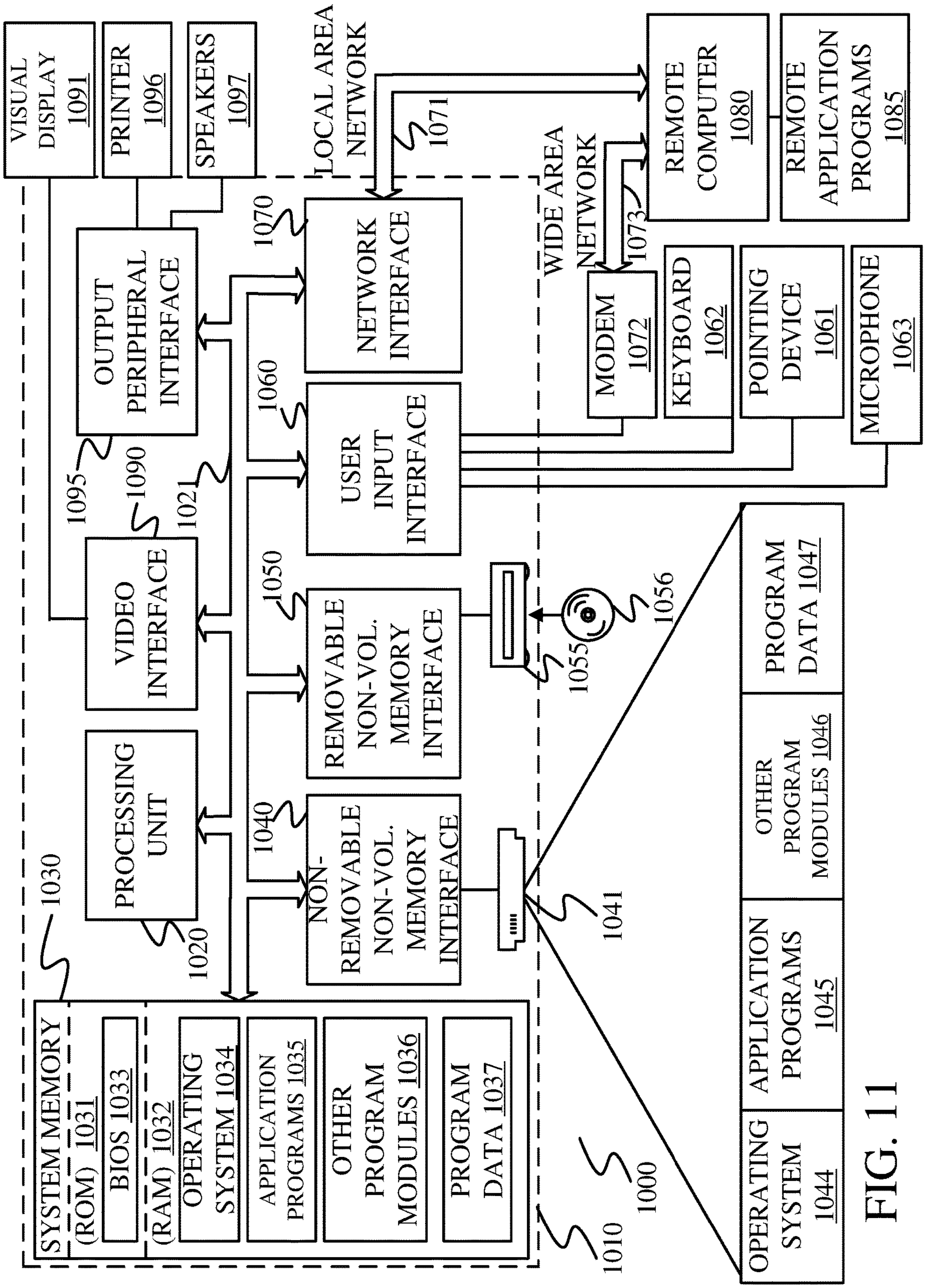
FIG. 11 is a block diagram showing one example of a computing environment that can be used in the architecture illustrated in previous FIGS.

FIG. 11 is one embodiment of a computing environment in which elements of FIG. 3, or parts of it, (for example) can be deployed. With reference to FIG. 11, an example system for implementing some embodiments includes a general-purpose computing device in the form of a computer 1010. Components of computer 1010 may include, but are not limited to, a processing unit 1020 (which can comprise processors or servers from other FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIG. 3 can be deployed in corresponding portions of FIG. 11.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 11 illustrates operating system 1034, application programs 1035, other program modules 1036, and program data 1037.

The computer 1010 may also include other removable/non-removable volatile/nonvolatile computer storage media. By way of example only, FIG. 11 illustrates a hard disk drive 1041 that reads from or writes to non-removable, nonvolatile magnetic media, an optical disk drive 1055, and nonvolatile optical disk 1056. The hard disk drive 1041 is typically connected to the system bus 1021 through a non-removable memory interface such as interface 1040, and optical disk drive 1055 are typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 1010. In FIG. 11, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include foot pedals, steering wheels, levers, buttons, a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network WAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 11 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Example 1 is a mobile agricultural sprayer configured to spray a substance along a worksite, comprising:

a frame;

a spraying system that sprays the substance;

at least one sensor configured to generate a signal indicative of a temperature inversion at the worksite;

an inversion detection system configured to detect a presence of the temperature inversion at the worksite based on the sensor signal, and, based on the detected presence, generate a temperature inversion output indicative of the presence of the temperature inversion; and an action signal generator configured to receive the temperature inversion output from the inversion detection system, and, based on the received temperature inversion output, generate an action signal.

Example 2 is the mobile agricultural sprayer of any or all previous examples wherein the at least one sensor comprises:

at least one temperature sensor located on the mobile agricultural sprayer configured to generate a temperature signal indicative of an air temperature.

Example 3 is the mobile agricultural sprayer of any or all previous examples wherein the at least one sensor comprises:

a spray cloud detector configured to generate signals indicative of a duration of time the sprayed substance is suspended in the air.

Example 4 is the mobile agricultural sprayer of any or all previous examples wherein the inversion detection system comprises:

inversion detection logic configured to receive a plurality of temperature sensor signals indicative of air temperatures at different elevations, and detect the presence of the temperature inversion based on a difference between the measured air temperatures and a comparison of the difference to a threshold value.

Example 5 is the mobile agricultural sprayer of any or all previous examples further comprising:

a user interface device; and user interface logic configured to receive the action signal indicative of the presence of the temperature inversion from the action signal generator and generate a display indicating the temperature inversion, on the user interface device, to an operator of the mobile agricultural sprayer.

Example 6 is the mobile agricultural sprayer of any or all previous examples further comprising:

sprayable area identification logic configured to identify a geographic location in the worksite where a temperature inversion is not present, and generate a recommendation, on the user interface device, to spray the substance at the geographic location(s) in the worksite where the detected temperature inversion is not present.

Example 7 is the mobile agricultural sprayer of any or all previous examples further comprising:

a controllable subsystem; and a control system configured to receive the action signal indicative of the presence of the temperature inversion from the action signal generator and generate control signals to the controllable subsystem to modify an operating parameter of the mobile agricultural sprayer based on the received action signal.

Example 8 is the mobile agricultural sprayer of any or all previous examples further comprising:

an inversion prediction system configured to receive temperature inversion data indicative of a future presence of a temperature inversion at the worksite, and, based on the received temperature inversion data, predict the future presence of the temperature inversion at the worksite.

Example 9 is the mobile agricultural sprayer of any or all previous examples wherein the inversion prediction system is configured to receive, as the received temperature inversion data, data comprising weather data and worksite data indicative of topographical information at the worksite in order to predict the future presence of the temperature inversion at the worksite.

Example 10 is the mobile agricultural sprayer of any or all previous examples wherein the inversion prediction system is configured to receive, as the received temperature inversion data, data comprising historical temperature inversion data for the worksite in order to predict the future presence of the temperature inversion at the worksite.

Example 11 is the mobile agricultural sprayer of any or all previous examples wherein the inversion prediction system comprises:

prediction logic configured to receive the temperature inversion data indicative of the future presence of the temperature inversion, predict the future presence of the temperature inversion, and generate a prediction output based on the predicted future presence of the temperature inversion;

duration logic configured to receive the prediction output from the prediction logic, determine a duration for the predicted future presence of the temperature inversion, and generate a duration output based on the determined duration;

location logic configured to receive the prediction output from the prediction logic, determine at least one worksite area where the predicted future presence of the temperature inversion will occur, and generate a location output based on the determined at least one worksite area; and a forecast generator configured to receive the prediction output, the duration output and the location output and generate a temperature inversion forecast based on the received outputs.

Example 12 is the mobile agricultural sprayer of any or all previous examples wherein the user interface logic is further configured to display the temperature inversion forecast to the operator of the mobile agricultural sprayer.

Example 13 is a computing system, comprising:

an inversion detection system configured to receive an indication of a temperature inversion based on received sensor signals, detect a presence of the temperature inversion at an agricultural worksite based on the received indication, and, based on the detected presence, generate a temperature inversion output indicative of the presence of the temperature inversion; and an action signal generator configured to receive the temperature inversion output and, based on the received temperature inversion output, generate an action signal to control an agricultural sprayer.

Example 14 is the computing system of any or all previous examples further comprising:

sensor accessing logic configured to receive the indication of a temperature inversion as a set of temperature signals generated by accessing a temperature sensor on an unmanned aerial vehicle (UAV).

Example 15 is the computing system of any or all previous examples wherein the inversion detection system comprises:

UAV control logic configured to control the UAV to travel to a plurality of different elevations at the agricultural worksite to generate the sensor signals indicative of air temperature at each of the plurality of elevations at the agricultural worksite.

Example 16 is the computing system of any or all previous examples further comprising:

sensor accessing logic configured to access one or more sensors on a ground-based asset located at the agricultural worksite.

Example 17 is the computing system of any or all previous examples wherein the sensor accessing logic is configured to access the plurality of sensors located at different elevations on the ground-based asset.

Example 18 is a computer-implemented method of detecting a presence of a temperature inversion, comprising:

receiving a plurality of sensor signals indicative of a presence of a temperature inversion at an agricultural worksite;

generating an indication of the temperature inversion based on the received plurality of sensor signals; and generating an action signal to control an agricultural sprayer based on the received temperature inversion output.

Example 19 is the method of any or all previous examples further comprising:

generating a display on a user interface device of the agricultural sprayer based on the action signal, wherein the display notifies an operator of the detected presence of the temperature inversion.

Example 20 is the method of any or all previous examples further comprising: generating a control signal to control a controllable subsystem on the agricultural sprayer based on the action signal, the control signal configured to modify an operating characteristic of the controllable subsystem on the agricultural sprayer.

What is claimed is:

1. A mobile agricultural sprayer configured to spray a substance along a worksite, comprising:

a frame;

a spraying system that sprays the substance;

at least one sensor configured to generate a sensor signal indicative of a temperature inversion at the worksite;

an inversion detection system configured to detect a presence of the temperature inversion at the worksite based on the sensor signal, and based on the detected presence, generate a temperature inversion output indicative of the presence of the temperature inversion; and an action signal generator configured to receive the temperature inversion output from the inversion detection system, and based on the received temperature inversion output, generate an action signal indicative of a route for the mobile agricultural sprayer through the worksite.

2. The mobile agricultural sprayer of claim 1, wherein the at least one sensor comprises:

at least one temperature sensor located on the mobile agricultural sprayer configured to generate a temperature signal indicative of an air temperature.

3. The mobile agricultural sprayer of claim 2, wherein the inversion detection system comprises:

inversion detection logic configured to receive a plurality of temperature sensor signals indicative of air temperatures at different elevations, and detect the presence of the temperature inversion based on a difference between the air temperatures and a comparison of the difference to a threshold value.

4. The mobile agricultural sprayer of claim 1, further comprising:

a user interface device; and user interface logic configured to generate a display indicating the temperature inversion, on the user interface device, to an operator of the mobile agricultural sprayer based on the temperature inversion output.

5. The mobile agricultural sprayer of claim 4, and further comprising:

sprayable area identification logic configured to identify a geographic location on the worksite where a temperature inversion is not present, and generate a recommendation, on the user interface device, to spray the substance at the geographic location in the worksite where the detected temperature inversion is not present.

6. The mobile agricultural sprayer of claim 5, further comprising:

a controllable nozzle subsystem; and a control system configured to generate control signals to the nozzle subsystem to control operation of at least one spray nozzle of the mobile agricultural sprayer based on the identified geographic location.

7. A computing system, comprising:

an inversion detection system configured to receive an indication of a temperature inversion based on received sensor signals, detect a presence of the temperature inversion at an agricultural worksite based on the received indication, and based on the detected presence, generate a temperature inversion output indicative of the presence of the temperature inversion; and an action signal generator configured to receive the temperature inversion output and, based on the received temperature inversion output, generate an action signal to control a position of a boom on an agricultural sprayer.

8. A computer-implemented method of detecting a presence of a temperature inversion, comprising:

receiving a plurality of sensor signals indicative of a presence of a temperature inversion at an agricultural worksite;

generating an indication of the temperature inversion based on the received plurality of sensor signals;

identifying a first geographic location of the agricultural worksite where the temperature inversion is not present based on the generated indication of the temperature inversion; and generating an action signal to control an agricultural sprayer based on the identified first geographic location.

9. The method of claim 8, further comprising:

generating a display on a user interface device of the agricultural sprayer that notifies an operator of the detected presence of the temperature inversion.

10. The method of claim 9, further comprising:

generating a control signal to control a controllable subsystem on the agricultural sprayer based on the action signal, the control signal configured to modify an operating characteristic of the controllable subsystem on the agricultural sprayer.

11. The method of claim 10, further comprising:

identifying a second geographic location of the agricultural worksite where the temperature inversion is present based on the generated indication of the temperature inversion.

12. The method of claim 11, wherein generating an action signal comprises:

generating a control signal to control a nozzle subsystem to activate or deactivate at least one spray nozzle on the agricultural sprayer based on the identified first and second geographic locations.

13. The method of claim 11, wherein generating a control signal comprises:

controlling the at least one spray nozzle to deactivate the at least one spray nozzle as the agricultural sprayer travels over the identified second geographic location.

14. The method of claim 12, further comprising:

storing the identified second geographic location of the agricultural worksite where the temperature inversion is present in a data store; and generating a control signal to control the agricultural sprayer to travel back to the stored second geographic location at a time when a temperature inversion is no longer present.

15. The mobile agricultural sprayer of claim 5, wherein the route is further based on the identified geographic location.

16. The mobile agricultural sprayer of claim 15, wherein the route comprises a first route that has the agricultural sprayer travel only through geographic locations in the worksite where a temperature inversion is not present.

17. The mobile agricultural sprayer of claim 16, wherein the action signal generator generates an action signal indicative of a second route through portions of the worksite avoided by the first route when the temperature inversion is no longer present in those portions of the worksite.

18. The computing system of claim 7, wherein the action signal generator generates the action signal to raise or lower the position of the boom relative to a surface of the agricultural worksite over which the agricultural sprayer travels.

19. The computing system of claim 7, wherein the inversion detection system further comprises:

sprayable area identification logic that identifies geographic locations in the agricultural worksite where a temperature inversion is present and identifies geographic locations in the agricultural worksite where a temperature inversion is not present.

20. The computing system of claim 19, wherein the action signal generator generates the action signal to control the position, of the boom based on the geographic locations on the agricultural worksite where the temperature inversion is present.

* * * * *